(12) United States Patent
Umansky et al.

(10) Patent No.: US 10,414,991 B2
(45) Date of Patent: Sep. 17, 2019

(54) PROCESSING OF HEAVY HYDROCARBON FEEDS

(71) Applicant: ExxonMobil Research and Engineering Company, Annandale, NJ (US)

(72) Inventors: Benjamin S. Umansky, Fairfax, VA (US); Himanshu Gupta, Lebanon, NJ (US); John D. Nelson, Plainfield, IL (US); Cindy J. Hughart, Huntington, WV (US); Jane C. Cheng, Bethlehem, PA (US); Steven W. Levine, Hopewell, NJ (US); Stephen H. Brown, Lebanon, NJ (US); Todd P. Marut, The Woodlands, TX (US); David C. Dankworth, Princeton, NJ (US); Stuart L. Soled, Pittstown, NJ (US); Thomas F. Degnan, Jr., South Bend, IN (US); Robert J. Falkiner, Brampton (CA); Mohsen N. Harandi, New Hope, PA (US); Juan D. Henao, Houston, TX (US); Lei Zhang, Basking Ridge, NJ (US); Chuansheng Bai, Phillipsburg, NJ (US); Richard C. Dougherty, Moorestown, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 89 days.

(21) Appl. No.: 15/626,288

(22) Filed: Jun. 19, 2017

(65) Prior Publication Data

US 2018/0002617 A1 Jan. 4, 2018

Related U.S. Application Data

(60) Provisional application No. 62/356,231, filed on Jun. 29, 2016.

(51) Int. Cl.

| | |
|---|---|
| *C10G 65/12* | (2006.01) |
| *B01J 27/185* | (2006.01) |
| *B01J 27/186* | (2006.01) |
| *B01J 35/10* | (2006.01) |
| *C10G 31/09* | (2006.01) |
| *C10G 45/16* | (2006.01) |
| *C10G 67/14* | (2006.01) |
| *B01J 23/885* | (2006.01) |
| *B01J 27/19* | (2006.01) |
| *C10G 45/08* | (2006.01) |
| *C10G 47/04* | (2006.01) |
| *B01J 23/882* | (2006.01) |

(52) U.S. Cl.
CPC ............ *C10G 65/12* (2013.01); *B01J 23/882* (2013.01); *B01J 23/885* (2013.01); *B01J 27/19* (2013.01); *B01J 35/1028* (2013.01); *B01J 35/1038* (2013.01); *B01J 35/1047* (2013.01); *B01J 35/1061* (2013.01); *C10G 31/09* (2013.01); *C10G 45/08* (2013.01); *C10G 45/16* (2013.01); *C10G 47/04* (2013.01); *C10G 67/14* (2013.01); *C10G 2300/202* (2013.01); *C10G 2300/205* (2013.01)

(58) Field of Classification Search
CPC .............. C10G 65/12; C10G 2300/201; C10G 2300/301; B01J 27/185; B01J 27/186; B01J 35/1004; B01J 35/1033; B01J 35/1061

See application file for complete search history.

(56) References Cited

U.S. PATENT DOCUMENTS

| | | | |
|---|---|---|---|
| 3,617,525 A | 11/1971 | Moritz et al. | |
| 4,302,323 A | 11/1981 | Chen | |
| 4,421,633 A | 12/1983 | Shih et al. | |
| 4,525,267 A | 6/1985 | Inooka | |
| 4,585,546 A | 4/1986 | Bowes et al. | |
| 4,591,426 A * | 5/1986 | Krasuk | B01J 21/04 208/111.2 |
| 2008/0041762 A1 | 2/2008 | Brons et al. | |
| 2009/0032435 A1 | 2/2009 | Brons et al. | |
| 2009/0159505 A1 | 6/2009 | Da Costa et al. | |

(Continued)

FOREIGN PATENT DOCUMENTS

WO 2010019551 A1 12/2010

OTHER PUBLICATIONS

Werzel, "Veba Combi-Cracking Process for Heavy Oil Upgrading—Background and Experience", 14th World Petroleum Congress, Stavanger, Norway, May 29-Jun. 1, 1994.

(Continued)

Primary Examiner — Randy Boyer
(74) Attorney, Agent, or Firm — Priya G. Prasad

(57) ABSTRACT

Systems and methods are provided for hydroconversion of a heavy oil feed under slurry hydroprocessing conditions and/or solvent assisted hydroprocessing conditions. The systems and methods for slurry hydroconversion can include the use of a configuration that can allow for improved separation of catalyst particles from the slurry hydroprocessing effluent. In addition to allowing for improved catalyst recycle, an amount of fines in the slurry hydroconversion effluent can be reduced or minimized. This can facilitate further processing or handling of any "pitch" generated during the slurry hydroconversion. The systems and methods for solvent assisted hydroprocessing can include processing of a heavy oil feed in conjunction with a high solvency dispersive power crude.

6 Claims, 12 Drawing Sheets

(56) References Cited

U.S. PATENT DOCUMENTS

2013/0081977 A1    4/2013  Woo et al.
2015/0008157 A1    1/2015  Smiley et al.
2015/0014216 A1*   1/2015  Sundararaman ..... B01J 23/8906
                                                        208/49

OTHER PUBLICATIONS

Davis et al. "Evaluation of heavy oil upgrading/refining process designs for HRI Dynacracking and UOP Aurabon Process. Final report", U.S. Department of Energy, Apr. 1, 1984, pp. 1-148. DOE/BC/10349-1.
Walker, "Gulf Canada donor refined bitumen (DRB) process", The American Society of Mechanical Engineers, Feb. 1, 1984, pp. 1-8, OSTI ID: 6850256.
Chevron Lummus LC-FINING®, http://www.cbi.com/lummus/procestechnology/pdfs/LC-Fining.pdf, pp. 1-2. (2012).
Niu et al., "RICP, A Novel Integrated Process to Get More Light Oil From Residue", The 14th International Congress on Catalysis, Seoul, South Korea, Jul. 2008, pp. 1-7.
Pereira, "Mild Hydrocracking using IsoTherming™ Technology", 2008 Annual Meeting of the NPRA, San Diego, California, Mar. 10, 2008, pp. 1-26.
Epperly, "EDS Coal Liquefaction Process Development: Phase V. Final Technical progress Report", DOE Report, vol. I, 1984. pp. 1-188.
Gutberlet et al., "Design of a Nickel-Tungsten Hydrocracking Catalyst", Energy & Fuels, Jan. 1, 1994, pp. 227-233, vol. 8, No. 1, American Chemical Society.
PCT/US2017/038077 International Search Report and Written Opinion dated Oct. 23, 2017.

\* cited by examiner

PROCESSING OF HEAVY HYDROCARBON FEEDS

CROSS-REFERENCE TO RELATED APPLICATIONS

This application claims the benefit of U.S. Provisional Application No. 62/356,231, filed on Jun. 29, 2016, the entire contents of which are incorporated herein by reference.

FIELD

This invention is directed to systems and methods for processing residua and/or heavy hydrocarbon feeds.

BACKGROUND

Crude oil is typically distilled to produce a variety of components that can be used directly as fuels or that are used as feedstocks for further processing or upgrading. In what is known as atmospheric distillation, a heavy residuum is produced typically that has an initial boiling point of about 650° F. (~343° C.). This residuum is typically referred to as atmospheric residuum or as an atmospheric residuum fraction.

Atmospheric residuum fractions tend to collect a relatively high quantity of various metals, sulfur components and nitrogen components relative to the lighter distillation fractions as a result of the distillation process. Because these metal, sulfur, and nitrogen components are relatively undesirable in various fuels, they are typically removed by various catalytic hydroprocessing techniques.

In some instances, the atmospheric residuum is further distilled under vacuum, i.e., at a pressure below atmospheric pressure, to recover additional distillation fractions. At vacuum conditions, additional lighter fractions can be recovered without adding to various problems encountered in atmospheric distillation such as coking of the heavy fraction components. The heavy residuum recovered in vacuum distillation of the atmospheric residuum is typically referred to as vacuum residuum or a vacuum residuum fraction, and typically has an initial boiling point of about 1050° F. (~566° C.). This vacuum residuum is generally higher in metals, sulfur components and nitrogen components than atmospheric residuum, and as was the case with atmospheric residuum, removal of these components is typically carried out by catalytic hydroprocessing.

Catalytic hydroprocessing of atmospheric and vacuum residua is carried out in the presence of hydrogen, using a hydroprocessing catalyst. In some processes, hydroprocessing of residua is carried out by adding a diluent or solvent. In other processes, hydroprocessing can be performed under slurry hydroprocessing conditions.

U.S. Pat. No. 3,617,525 discloses a process for removing sulfur from a hydrocarbon fraction having a boiling point above about 650° F. (~343° C.). In carrying out the process, the hydrocarbon fraction is separated into a gas oil fraction having a boiling point between about 650° F. (~343° C.) and about 1050° F. (~566° C.), and a heavy residuum fraction boiling above about 1050° F. (~566° C.). The gas oil fraction is catalytically hydrodesulfurized until the gas oil fraction contains less than 1 percent sulfur. The hydrodesulfurized gas oil is then used to dilute the heavy residuum fraction, and the diluted heavy residuum fraction is catalytically hydrodesulfurized, producing fuels or fuel blending components reduced in sulfur content. The process is considered to provide an increased catalyst life and to use a smaller reactor volume compared to typical processes.

U.S. Pat. No. 4,302,323 discloses a process for upgrading a residual petroleum fraction in which the residual fraction is mixed with a light cycle oil and hydrogen and the mixture sent through a catalytic hydrotreating zone containing a hydrotreating catalyst and then a hydrocracking zone containing a hydrocracking catalyst. Upgraded products are then separated from the effluent of the hydrocracking zone. The light cycle oil boils in the range of from 400° F. (~204° C.) to 700° F. (~371° C.), has a high aromatic content, and is high in nitrogen. It is considered that the light cycle oil acts more as a diluent rather than as a hydrogen donor and that the addition of the light cycle oil resulted in a substantial increase in the yield of premium products such as distillate fuels.

U.S. Pat. No. 4,421,633 discloses a combination hydrodesulfurization and hydrocracking process. The feedstock can be atmospheric residuum or vacuum residuum, which is mixed with a solvent that is a recycled distillate boiling at about 400° F.-700° F. (~204° C.-371° C.), considered to be equivalent to a FCC light cycle oil. The process uses a mixture of large pore and small pore catalysts such as large pore and small pore sulfided Ni—W catalysts. The large pore catalyst has a median pore diameter of 180 Å, while the small pore catalyst has a median pore diameter of about 60 Å with no pores larger than 80 Å. The process converts the higher boiling point residua to lower boiling point hydrocarbons by forming distillate and naphtha while removing heteroatoms, metals and carbon residuals from the higher boiling point residua. It is noted that the description also includes examples where no solvent is used. The desulfurization activity in examples without solvent appears to be comparable or superior to the desulfurization activity for the examples that include a solvent.

U.S. Pat. No. 4,585,546 describes methods for hydrotreating petroleum heavy ends in aromatic solvents with large pore size alumina. The methods include processing resids mixed with a solvent such as ortho-xylene or a light cycle oil at 1000 psig (5.5 MPag) and 350° C. The resids were hydroprocessed in the presence of either a commercial hydrodesulfurization catalyst with a median pore size of 70 Å to 80 Å or a hydrodesulfurization catalyst with an alumina support having a median pore size of about 220 Å. The larger pore catalyst was shown to have higher activity for metals removal and comparable activity for sulfur removal as compared to the smaller pore catalyst.

U.S. Patent Application Publication No. 2013/0081977 describes methods for solvent-assisted hydroprocessing of heavy oil feeds in the presence of a catalyst with a median pore size of about 85 Å to about 120 Å. The methods can include lower pressure processing of heavy oil feeds, which can allow for extended processing times and/or extended catalyst lifetimes by reducing or mitigating the amount of coke formation on the hydroprocessing catalyst.

U.S. Patent Application Publication No. 2015/0008157 describes methods for slurry hydroconversion and coking of heavy oils. The combination of coking and slurry hydroconversion is described as allowing for improved yield of liquid products while reducing or minimizing the consumption of hydrogen in slurry hydroconversion reaction stages.

U.S. Patent Application Publication No. 2008/0041762 describes addition of high solvency dispersive power crude oil to a blend of incompatible oils to reduce or minimize potential fouling in heat exchange equipment.

SUMMARY

In an aspect, a process for producing a hydroprocessed product is provided. The process can include exposing a feedstock to a catalyst under effective slurry hydroconversion conditions to form a slurry hydroprocessing effluent. The effective slurry hydroconversion conditions can be effective for conversion of at least about 90 wt % of the feedstock relative to a conversion temperature. The catalyst can comprise catalyst particles having a particle size of at least about 2 μm. The process can further include separating at least about 95 wt % of the catalyst particles having a particle size of at least about 2 μm from the slurry hydroprocessing effluent using a catalyst recovery system. The catalyst recovery system can include one or more drum separators, such as cyclone separators. The catalyst recovery system can further include a cross-flow filter.

In another aspect, a catalyst composition is provided. The catalyst composition can include at least about 1.0 wt % of a Group 6 metal and/or at least about 0.5 wt % of a Group 8-10 metal and/or at least about 1.0 wt % of phosphorus on a support. The catalyst can have a mean pore diameter of about 150 Å or less. Optionally, the catalyst can have at least one of (or optionally both of) a micro pore volume of less than about 0.05 $cm^3/g$ and a ratio of external surface area to total surface area of at least about 0.80. Optionally, the support can comprise alumina, such as γ-alumina, θ-alumina, or a combination thereof.

In still another aspect, a catalyst composition is provided. The catalyst composition can include at least about 1.0 wt % of a Group 6 metal and/or at least about 0.5 wt % of a Group 8-10 metal on a support. The catalyst can have surface area of at least about 1000 $m^2/g$ and/or a mean pore diameter of 60 Å or less and/or a micro pore volume of at least 0.1 $cm^3/g$. Optionally, the support optionally can be substantially free of alumina.

In yet another aspect, a system for producing a hydroprocessed product is provided. The system can include a slurry hydroprocessing reactor having a feed inlet and a reactor outlet. The system can also include a product recovery separation stage. The system can also include a catalyst recovery system. The catalyst recovery system can include one or more drum separators having a lower density outlet and a higher density outlet, such as cyclone separators. At least one drum separator can have a drum separator inlet in fluid communication with the reactor outlet. The catalyst recovery system can further include a cross-flow filter, at least one drum separator having a lower density outlet in indirect fluid communication with the product recovery separation stage via the cross-flow filter. The catalyst recovery system can be configured for separation of at least about 95 wt % of the catalyst particles having a particle size of at least about 2 μm from a slurry hydroprocessing effluent.

In still another aspect, a process for producing a hydroprocessed product is provided. The process can include exposing a combined feedstock comprising a heavy oil feed component and at least about 5 wt % of a High Solvency Dispersive Power (HSDP) crude component to a hydroprocessing catalyst under effective fixed bed hydroprocessing conditions to form a hydroprocessed effluent. The effective fixed bed hydroprocessing conditions can include a pressure of about 1500 psig (~10.3 MPa) or less and/or a temperature of at least about 360° C. and/or a liquid hourly space velocity of the fraction of the combined feedstock boiling above 1050° F. (~566° C.) of at least about 0.10 $hr^{-1}$. Optionally, the HSDP crude component can have a TAN of at least about 0.3 and a solubility blending number of at least about 75. The HSDP crude component can optionally have an aromatics content of at least about 50 wt %. Optionally, the effective fixed bed hydroprocessing conditions can be effective for conversion of from about 50 wt % to about 70 wt % of the ~1050° F.+(~566° C.+) portion of the heavy oil feed component.

DETAILED DESCRIPTION

Overview

Figure 1:
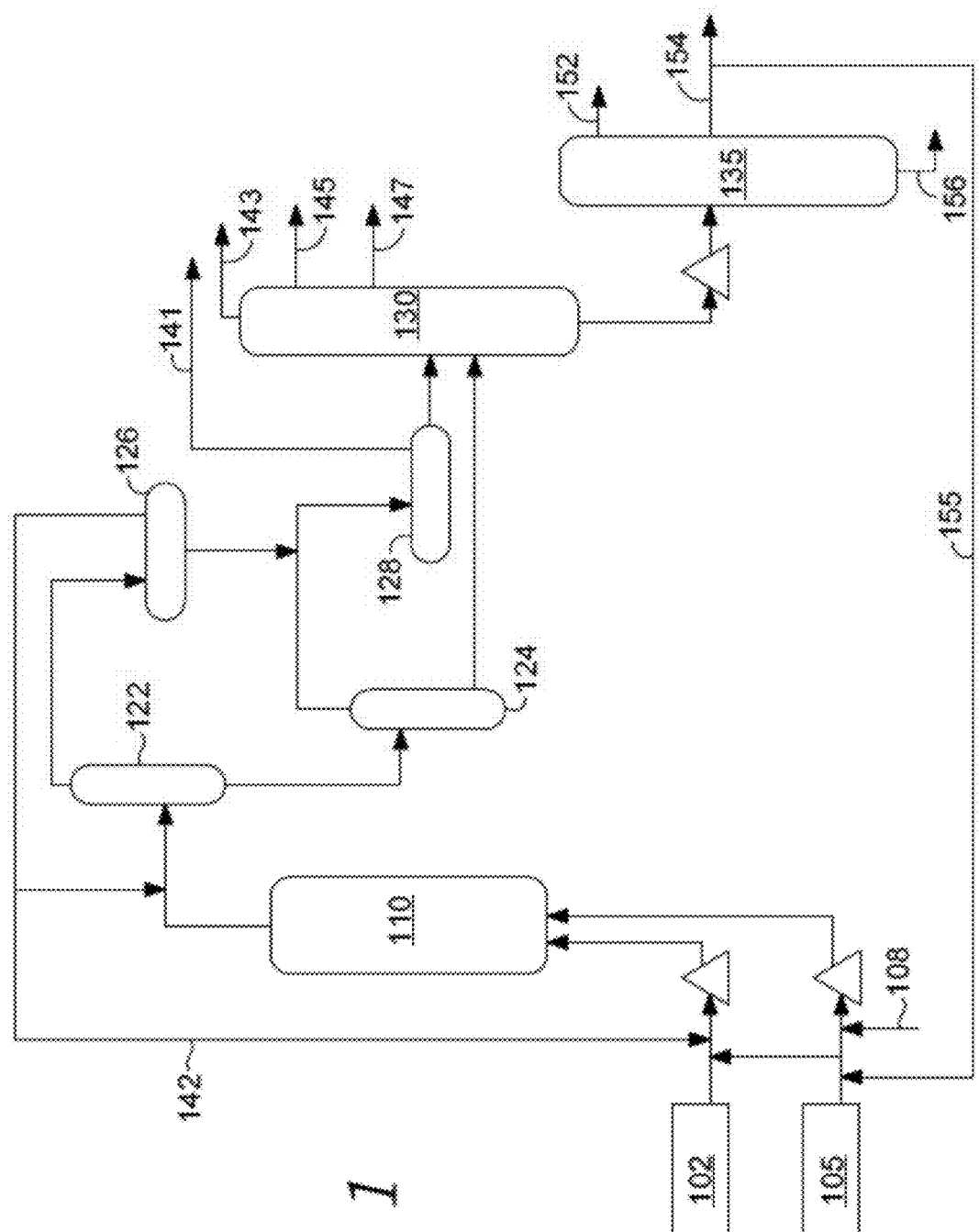
FIG. 1 shows an exemplary configuration of a slurry hydroprocessing system.

In various aspects, systems and methods are provided for hydroconversion of a heavy oil feed under slurry hydroprocessing conditions. The systems and methods for slurry hydroconversion can include the use of a configuration that can allow for improved separation of catalyst particles from the slurry hydroprocessing effluent. In addition to allowing for improved catalyst recycle, an amount of fines in the slurry hydroconversion effluent can be reduced or minimized. This can facilitate further processing or handling of any "pitch" generated during the slurry hydroconversion.

Slurry hydroprocessing can potentially provide a variety of advantages when attempting to process challenged feeds. Some feeds can be difficult to process due to a tendency for catalyst in a fixed bed to deactivate, such as due to metal deposition and/or coke formation. Other feeds can be difficult to process in a fixed bed environment due to plugging, channeling, or other flow problems within the fixed bed(s) as carbonaceous materials (such as coke) can deposit on the catalyst and/or fill spaces between catalyst particles. Still other feeds can pose difficulties on a longer time scale due to deactivation of a catalyst over time. For example, many types of hydroprocessing catalysts (such as hydrotreating catalysts) can slowly deactivate over time when processing a variety of feeds. This slow deactivation over time is generally accounted for in a fixed bed environment by increasing the processing temperature over time. While this can be effective at extending the run length for a fixed bed reactor, eventually the reaction temperature can reach a practical limit where further temperature increases can be undesirable. At that point, a typical fixed bed reactor can be shut down to allow for replacement of the deactivated catalyst.

The various types of situations noted above can lead to short or reduced run lengths for a fixed bed reactor. In various aspects, slurry hydroprocessing can reduce, mitigate, or minimize one or more of the above difficulties associated with catalyst deactivation and/or reactor flow maldistribution. During slurry hydroprocessing, a portion of the slurry catalyst can be withdrawn and replaced by fresh catalyst while the reactor is in operation. This can substantially extend the reactor run length when processing a feed that can cause catalyst deactivation, regardless of whether the deactivation occurs on a short time scale or a longer time scale. Additionally, due to the nature of the slurry processing environment, a fixed bed of catalyst is typically not present. This can reduce or minimize the likelihood of a flow maldistribution being caused by side reactions that occur during the slurry hydroprocessing.

In some aspects, systems and methods are provided for improved demetallization of heavy oil feeds, such as during solvent assisted hydroprocessing and/or slurry hydroconversion of a heavy oil feedstock. The systems and methods can include use of alternative types of demetallization catalysts, performing demetallization in a separate slurry hydroprocessing stage, or a combination thereof.

In some aspects, processes are provided for producing a hydroprocessed product from a heavy oil feedstock in a fixed bed processing environment. The process can be capable of treating residua or other heavy hydrocarbon oils to produce a hydroprocessed oil product that has a reduced content sulfur, nitrogen, and/or metals. Additionally or alternatively, the process can allow for production of a hydroprocessed oil product that has a reduced content of ~1050° F.+(~566° C.+) components (i.e., components that boil at ~1050° F. (~566° C.) and above) relative to a heavy oil feedstock. The processing of a heavy oil can be facilitated by using a high solvency dispersive power (HSDP) crude as at least a portion of the feedstock. Optionally, the processing of a heavy oil feedstock can be facilitated by recycling a portion of the total liquid effluent from conversion of the heavy oil for use as a solvent and/or by using a separate solvent as part of the input to the heavy oil hydroprocessing reaction.

One difficulty encountered during heavy oil processing can be relatively short catalyst lifetimes. Due to the nature of heavy oil feeds, conventional processing of heavy oil feeds can tend to result in coking of hydroprocessing catalysts. Heavy oil feeds can also typically contain high concentrations of metals that can further contribute to deactivation of hydroprocessing catalysts. In order to overcome these difficulties, catalysts with large pore size supports have been used conventionally for processing of heavy feeds, such as catalysts with pore sizes of 150 Å or more, as such catalysts are believed to provide superior lifetime and reactivity. Part of the enhanced lifetime of these larger pore catalysts was believed to be due to the ability of such catalysts to remove metals from a heavy oil feed while avoiding concentration of such metals at the surface of the catalyst. Additionally, high partial pressures of hydrogen have been used to mitigate the deposition of coke on the catalyst.

In various aspects, hydroprocessing with improved catalyst lifetime can be performed by incorporating a solvent into a heavy oil feed. By using the solvent, the feed can be hydroprocessed in the presence of a hydroprocessing catalyst at temperatures of at least about 360° C. and at hydrogen partial pressures of about 1500 psig (~10.3 MPag) or less, or about 1000 psig (~6.9 MPag) or less, or about 800 psig (~5.5 MPag) or less. In particular, the hydrogen partial pressure can be about 200 psig (~1.4 MPag) to about 1500 psig (~10.3 MPag), for example about 400 psig (~2.8 MPag) to about 1000 psig (~6.9 MPag) or about 400 psig (~2.8 MPag) to about 800 psig (~5.5 MPag). During hydroprocessing under these reaction conditions, reactions associated with thermal cracking can also take place in the reaction environment. Conventionally, such reaction conditions could lead to severe coking of a catalyst, resulting in short catalyst lifetime. Use of a suitable solvent can allow for extended catalyst lifetime while processing under such hydroprocessing conditions.

Additionally or alternately, in some aspects of the present invention, methods are provided for achieving a desired level of desulfurization and removal of other contaminants from a feed while reducing the amount of aromatic saturation. This can allow for increased contaminant removal without a corresponding increase in consumption of hydrogen by molecules with low hydrogen to carbon ratios.

Conventionally, processing of heavy oil fractions has previously required processing at hydrogen pressures of at least 1500 psig (~10.3 MPag) and a large ratio of hydrogen treat gas to feedstock flow. Under these conditions, hydrogen can be consumed by a variety of side reactions that may not be desirable. For example, some polynuclear aromatic (PNA) cores have a low ratio of hydrogen to carbon, and a substantial hydrogen investment can be required to convert them to distillate or naphtha fuels. More generally, the excess of hydrogen required under typical conditions can result in saturation of a variety of aromatic molecules that may not need hydrogenation to be included in a beneficial product fraction. As a result, the consumption of hydrogen during conventional processing of heavy oils can be high relative to stoichiometric need for desired reactions. By reducing the amount of aromatic saturation occurring at a given level of feed conversion, the ratio of hydrogen consumed by desired reactions versus hydrogen consumed by side reactions can be increased. In some aspects, the decrease in the relative amount of aromatic saturation can be facilitated by use of a small pore hydroprocessing catalyst.

Definitions

Reference is made to conversion of a feedstock relative to a conversion temperature T. Conversion relative to a temperature T is defined based on the portion of the feedstock that boils at a temperature greater than the conversion temperature T. The amount of conversion during a process (or optionally across multiple processes) is defined as the weight percentage of the feedstock that is converted from boiling at a temperature above the conversion temperature T to boiling at a temperature below the conversion temperature T. For example, consider a feedstock that includes ~40 wt % of components that boils at ~1050° F. (~566° C.) or greater. By definition, the remaining ~60 wt % of the feedstock boils at less than ~1050° F. (~566° C.). For such a feedstock, the amount of conversion relative to a conversion temperature of ~1050° F. (~566° C.) would be based only on the ~40 wt % that initially boils at ~1050° F. (~566° C.) or greater. If such a feedstock is exposed to a process with ~30% conversion relative to a ~1050° F. (~566° C.) conversion temperature, the resulting product would include ~72 wt % of components boiling below ~1050° F. (~566° C.) and ~28 wt % of components boiling above ~1050° F. (~566° C.).

In various aspects, reference may be made to one or more types of fractions generated during distillation of a petroleum feedstock. Such fractions may include, but are not necessarily limited to, naphtha fractions, kerosene fractions, diesel fractions, and vacuum gas oil fractions. Each of these types of fractions can be defined based on a boiling range, such as a boiling range that includes at least 90 wt % of the fraction, e.g., at least 95 wt % of the fraction (such as up to 100% of the fraction). For example, for many types of naphtha fractions, at least 90 wt % of the fraction, e.g., at least 95 wt % (such as up to 100%), can have a boiling point in the range of ~85° F. (~29° C.) to ~350° F. (~177° C.). For some heavier naphtha fractions, at least 90 wt % of the fraction, e.g., at least 95 wt % (such as up to 100%), can have a boiling point in the range of ~85° F. (~29° C.) to ~400° F. (~204° C.). For a kerosene fraction, at least 90 wt % of the fraction, e.g., at least 95 wt % (such as up to 100%), can have a boiling point in the range of ~300° F. (~149° C.) to ~600° F. (~288° C.). Alternatively, for a kerosene fraction targeted for some uses, such as jet fuel production, at least 90 wt % of the fraction, e.g., at least 95 wt %, can have a boiling point in the range of ~300° F. (~149° C.) to ~550° F. (~288° C.). For a diesel fraction, at least 90 wt % of the fraction, e.g., at least 95 wt % (such as up to 100%), can have a boiling point in the range of ~400° F. (~204° C.) to ~750° F. (~399° C.). For a vacuum gas oil fraction, at least 90 wt % of the fraction, e.g., at least 95 wt % (such as up to 100%), can have a boiling point in the range of ~650° F. (~343° C.) to ~1100° F. (~593° C.). Optionally, for some vacuum gas oil fractions, a narrower boiling range may be desirable. For such vacuum gas oil fractions, at least 90 wt % of the fraction, e.g., at least 95 wt % (such as up to 100%), can have a boiling point in the range of ~650° F. (~343° C.) to 1000° F. (~538° C.).

In this discussion, conditions may be provided for various types of hydroprocessing of feeds or effluents. Examples of hydroprocessing can include, but are not limited to, one or more of hydrotreating, hydrocracking, catalytic dewaxing, demetallization, and hydrofinishing/aromatic saturation. Such hydroprocessing conditions may include slurry hydroprocessing conditions for any of the above. Such hydroprocessing conditions can be controlled to have desired values for the conditions (e.g., temperature, pressure, LHSV, treat gas rate) by using at least one controller, such as a plurality of controllers, to control one or more of the hydroprocessing conditions. In some aspects, for a given type of hydroprocessing, at least one controller can be associated with each type of hydroprocessing condition. In other aspects, one or more of the hydroprocessing conditions can be controlled by an associated controller. Examples of structures that can be controlled by a controller can include, but are not limited to, valves that control a flow rate, a pressure, or a combination thereof; heat exchangers and/or heaters that control a temperature; and one or more flow meters and one or more associated valves that control relative flow rates of at least two flows. Such controllers can optionally include a controller feedback loop including at least a processor, a detector for detecting a value of a control variable (e.g., temperature, pressure, flow rate, and a processor output for controlling the value of a manipulated variable (e.g., changing the position of a valve, increasing or decreasing the duty cycle and/or temperature for a heater). Optionally, at least one hydroprocessing condition for a given type of hydroprocessing may not have an associated controller.

Heavy Oil Feed

In various aspects, a hydroprocessed product can be produced from a heavy oil feed component. Examples of heavy oils include, but are not limited to, heavy crude oils, distillation residues, heavy oils coming from catalytic treatment (such as heavy cycle oils from fluid catalytic cracking), thermal tars (such as oils from visbreaking or similar thermal processes), oils (such as bitumen) from oil sands, heavy oils derived from coal, and the like, as well as combinations thereof.

Heavy oils can be liquid, semi-solid, and/or solid. Additional examples of particular heavy oils that can be hydroprocessed, treated, or upgraded according to this invention can include, but need not be limited to, Athabasca bitumen, vacuum resid from Brazilian Santos and Campos basins, Egyptian Gulf of Suez, Chad, Venezuelan Zulia, Malaysia, and Indonesia Sumatra. Other examples of heavy oil can include residuum from refinery distillation processes, including atmospheric and vacuum distillation processes. Such heavy oils can have an initial ASTM D2887 boiling point, or 5% distillation point (T5), or 10% distillation point (T10), of 650° F. (~343° C.) or greater. Preferably, the heavy oils can have an ASTM D2887 10% distillation point of at least ~650° F. (~343° C.), alternatively at least ~660° F. (~349° C.) or at least ~750° F. (~399° C.). In some aspects the ASTM D2887 10% distillation point can be still greater, such as at least ~950° F. (~510° C.), such as at least ~1020° F. (~549° C.) or at least ~1050° F. (~566° C.). A corresponding upper end can be a final boiling point, or T95 boiling point, or T90 boiling point, which can typically be about ~1400° F. (~760° C.) or less.

In addition to initial boiling points and/or 10% distillation points, other distillation points may also be useful in characterizing a feedstock. For example, a feedstock can be characterized based on the portion of the feedstock that boils above ~1050° F. (~566° C.). In some aspects, a feedstock can have an ASTM D2887 70% distillation point of ~1050° F. (~566° C.) or greater, for example a 60% distillation point of ~1050° F. (~566° C.) or greater, a 50% distillation point of ~1050° F. (~566° C.) or greater, or a 40% distillation point of ~1050° F. (~566° C.) or greater.

Still another way of characterizing a feedstock is by characterizing the flow rate of a portion of the feed relative to the amount of catalyst being used for processing the feed. For example, in aspects involving fixed bed processing, the portion of a feedstock boiling at about 1050° F. (~566° C.) or above can often represent a more difficult portion of a feedstock to process. As a result, the practical flow rate for a feedstock can be influenced by the amount of the feedstock that boils above ~1050° F. (~566° C.) relative to the amount of hydroprocessing catalyst. In some aspects, the liquid hourly space velocity of the ~1050° F.+(~566° C.+) portion of a combined feedstock (including both fresh feed and HSDP crude component described below) relative to hydroprocessing catalyst in a fixed bed can be at least about 0.05 $hr^{-1}$, e.g., at least about 0.10 $hr^{-1}$, at least about 0.12 $hr^{-1}$, at least about 0.15 $hr^{-1}$, or at least about 0.20 $hr^{-1}$, such as up to about 1.0 $hr^{-1}$. In particular, the LHSV of the ~566° C.+ portion can be at least about 0.10 $hr^{-1}$, or e.g., at least about 0.12 $hr^{-1}$ or at least about 0.20 $hr^{-1}$, such as up to about 1.0 $hr^{-1}$.

Heavy oils can be relatively high in total acid number (TAN). TAN can be expressed in terms of mg of KOH per g of heavy oil. For example, some heavy hydrocarbon oils that can be optionally hydroprocessed according to this invention have a TAN of at least about 0.1, e.g., at least about 0.3 or at least about 1.0, such as up to about 2.5 or more. Total Acid Number can be determined by the standard method of KOH titration, as prescribed by ASTM D-974 Standard. Test Method for Acid and Base Number by Color-Indicator Titration.

Density, or weight per volume, of the heavy hydrocarbon can be determined according to ASTM D287-92 (2006) Standard Test Method for API Gravity of Crude Petroleum and Petroleum Products (Hydrometer Method), and is provided in terms of API gravity. In general, the higher the API gravity, the less dense the oil. API gravity can be at most 20° in one aspect, e.g., at most 15°, and at most 10°, such as down to about 5° or less.

Heavy oils can typically be high in metals content. For example, the heavy oil can be high in total nickel, vanadium, and iron contents. In one embodiment, the heavy oil can contain at least about 0.00005 grams of Ni/V/Fe (50 wppm), or at least about 0.0002 grams of Ni/V/Fe (200 wppm), per gram of heavy oil, on a total elemental basis of nickel, vanadium and iron, such as up to about 800 wppm or more.

Contaminants such as nitrogen and sulfur can typically be found in heavy oils, often in organically-bound form. Nitrogen content can range from about 50 wppm to about 5000 wppm elemental nitrogen, e.g., about 75 wppm to about 800 wppm or about 100 wppm to about 700 wppm, based on total weight of the heavy hydrocarbon component. The nitrogen containing compounds can be present as basic or non-basic nitrogen species. Examples of basic nitrogen species can include quinolines and substituted quinolines. Examples of non-basic nitrogen species can include carbazoles and substituted carbazoles.

Aspects of the invention are particularly suited to treating heavy oils containing at least 500 wppm elemental sulfur, based on total weight of the heavy oil. Generally, the sulfur content of such heavy oils can range from about 500 wppm to about 100000 wppm elemental sulfur, e.g., from about 1000 wppm to about 50000 wppm or from about 1000 wppm to about 30000 wppm, based on total weight of the heavy component. Sulfur can usually be present as organically bound sulfur. Examples of such sulfur compounds can include the class of heterocyclic sulfur compounds such as thiophenes, tetrahydrothiophenes, benzothiophenes, and their higher homologs and analogs, as well as combinations thereof. Other organically bound sulfur compounds can include aliphatic, naphthenic, and aromatic mercaptans, sulfides, di- and polysulfides, as well as combinations thereof.

Heavy oils can be high in n-pentane asphaltenes. In some aspects, the heavy oil can contain at least about 5 wt % of n-pentane asphaltenes, such as at least about 10 wt % or at least 15 wt % n-pentane asphaltenes, and optionally up to about 40 wt % n-pentane asphaltenes.

Still another method for characterizing a heavy oil feedstock can be based on the Conradson carbon residue (CCR) of the feedstock. The Conradson carbon residue of the feedstock can be at least about 5 wt %, such as at least about 10 wt % or at least about 20 wt %. Additionally or alternately, the Conradson carbon residue of the feedstock can be about 50 wt % or less, such as about 40 wt % or less or about 30 wt % or less. In particular, the Conradson carbon residue can be about 5 wt % to about 50 wt %, about 10 wt % to about 40 wt %, or about 10 wt % to about 30 wt %.

In some alternative aspects related to slurry hydroprocessing, feeds with a boiling point profile that can reduce or minimize the ~1100° F.+(~593° C.+) portion of the feed can be preferable. In such aspects, a suitable feed can have a T95 distillation point and/or a final boiling point of ~625° C. or less, e.g., ~600° C. or less or ~590° C. or less.

Slurry Hydroprocessing of Heavy Oil Feeds: General Slurry Processing

In certain aspects, a heavy oil feed can be exposed to hydroconversion conditions in a slurry reaction system. FIG. 1 shows an example of one reaction system suitable for performing slurry hydroconversion. The configuration in FIG. 1 is provided as an aid in understanding the general features of a slurry hydroconversion process. It should be understood that, unless otherwise specified, the conditions described in association with FIG. 1 can generally be applied to any convenient slurry hydroconversion configuration.

In FIG. 1, a heavy oil feedstock 105 can be mixed with a catalyst 108 prior to entering one or more slurry hydroconversion reactors 110 via a feed inlet. The mixture of feedstock 105 and catalyst 108 can be heated prior to entering reactor 110 in order to achieve a desired temperature for the slurry hydroconversion reaction. A hydrogen stream 102 can also be fed into reactor 110. In the configuration shown in FIG. 1, both the feedstock 105 and hydrogen stream 102 are shown as being heated prior to entering reactor 110. While a single heater is shown, typically the feedstock 105 and hydrogen stream 102 can be heated separately. Optionally, a portion of feedstock 105 can be mixed with hydrogen stream 102 prior to hydrogen stream 102 entering reactor 110. Optionally, feedstock 105 can also include a portion of recycled vacuum gas oil 155. Optionally, hydrogen stream 102 can also include a portion of recycled hydrogen 142.

The effluent from slurry hydroconversion reactor(s) 110 can be passed into one or more separation stages. For example, an initial separation stage can be a high pressure, high temperature (HPHT) separator 122. A higher boiling portion from the HPHT separator 122 can be passed to a low pressure, high temperature (LPHT) separator 124 while a lower boiling (gas) portion from the HPHT separator 122 can be passed to a high temperature, low pressure (HTLP) separator 126. The higher boiling portion from the LPHT separator 124 can be passed into a fractionator 130. The lower boiling portion from LPHT separator 124 can be combined with the higher boiling portion from HPLT separator 126 and passed into a low pressure, low temperature (LPLT) separator 128. The lower boiling portion from HPLT separator 126 can be used as a recycled hydrogen stream 142, optionally after removal of gas phase contaminants from the stream such as H₂S and/or NH₃. The lower boiling portion from LPLT separator 128 can be used as a flash gas or fuel gas 141. The higher boiling portion from LPLT separator 128 can be passed into fractionator 130.

In FIG. 1, fractionator 130 is shown as an atmospheric fractionator. The fractionator 130 can be used to form a plurality of product streams, such as a light ends or C4-stream 143, one or more naphtha streams 145, one or more diesel and/or distillate (such as including kerosene) fuel streams 147, and a bottoms fraction. The bottoms fraction can then be passed into vacuum fractionator 135 to form, for example, a light vacuum gas oil 152, a heavy vacuum gas oil 154, and a bottoms or pitch fraction 156. Optionally, other types and/or more types of vacuum gas oil fractions can be generated from vacuum fractionator 135. The heavy vacuum gas oil fraction 154 can be at least partially used to form a recycle stream 155 for combination with heavy oil feed 105.

In a reaction system, slurry hydroconversion can be performed by processing a feed in one or more slurry hydroconversion reactors. The reaction conditions in a slurry hydroconversion reactor can vary based on the nature of the catalyst, the nature of the feed, the desired products, and/or the desired amount of conversion. If more than one reactor is used, the operating conditions and type of catalyst used in each reactor could similar or different depending of the process requirements.

Slurry Hydroprocessing of Heavy Oil Feeds: Slurry Hydroprocessing Catalysts

Suitable catalyst concentrations can range from about 50 wppm to about 20000 wppm (i.e., about 2 wt %), depending on the nature of the catalyst. Catalyst can be incorporated into a hydrocarbon feedstock directly, or the catalyst can be incorporated into a side or slip stream of feed and then combined with the main flow of feedstock. Still another option can be to form catalyst in situ by introducing a catalyst precursor into a feed (or a side/slip stream of feed) and forming catalyst by a subsequent reaction. The catalyst particle size for a slurry hydroprocessing catalyst can be from about 2 μm to about 500 μm, such as at least about 20 μm and/or 100 μm or less.

Catalytically active metals for use in hydroconversion can include those from Group IVB, Group VB, Group VIB, Group VIIB, or Group VIII of the Periodic Table. Examples of suitable metals can include iron, nickel, molybdenum, vanadium, tungsten, cobalt, ruthenium, and mixtures thereof. The catalytically active metal may be present as a solid particulate in elemental form or as an organic compound or an inorganic compound such as a sulfide (e.g., iron sulfide) or other ionic compound. Metal or metal compound nanoaggregates may also be used to form the solid particulates.

A catalyst in the form of a solid particulate can generally comprise a compound of a catalytically active metal, or a metal in elemental form, either alone or supported on a refractory material such as an inorganic metal oxide (e.g., alumina, silica, titania, zirconia, and the like, as well as mixtures thereof). Other suitable refractory materials can include carbon, coal, and clays. Zeolites and non-zeolitic molecular sieves are additionally or alternately useful, e.g., as solid supports. One advantage of using a support can be its ability to act as a "coke getter" or adsorbent of asphaltene precursors that might otherwise lead to fouling of process equipment.

In some aspects, it can be desirable to form catalyst for slurry hydroconversion in situ, such as forming catalyst from a metal sulfate (e.g., iron sulfate monohydrate) catalyst precursor or another type of catalyst precursor that can decompose/react in the hydroconversion reaction zone environment, or in a pretreatment step, to form a desired, well-dispersed and catalytically active solid particulate (e.g., as iron sulfide). Precursors can also include oil-soluble organometallic compounds containing the catalytically active metal of interest that can thermally decompose to form the solid particulate (e.g., iron sulfide) having catalytic activity. Other suitable precursors can include metal oxides that may be converted to catalytically active (or more catalytically active) compounds such as metal sulfides. In a particular embodiment, a metal oxide containing mineral may be used as a precursor of a solid particulate comprising the catalytically active metal (e.g., iron sulfide) on an inorganic refractory metal oxide support (e.g., alumina).

Slurry Hydroprocessing of Heavy Oil Feeds: Reaction Conditions

The reaction conditions within a slurry hydroconversion reactor, such as for performing slurry hydroconversion on a feedstock as described herein, can include an operating temperature of about 400° C. to about 480° C., such as at least about 425° C. and/or about 450° C. or less. In particular, the operating temperature can be about 400° C. to about 480° C., about 425° C. to about 480° C., or about 400° C. to about 450° C. Some types of slurry hydroconversion reactors can be operated under high hydrogen partial pressure conditions, such as having a hydrogen partial pressure of about 1200 psig (~8.3 MPag) to about 3400 psig (~23.5 MPag), e.g., about 1500 psig (~10.4 MPag) to about 3400 MPag (~23.5 MPag), or about 2000 psig (~13.8 MPag) to about 3400 psig (~23.5 MPag). When the catalyst is in slurry form within the feedstock, the space velocity for a slurry hydroconversion reactor can be characterized based on the volume of feed processed relative to the volume of the reactor used for processing the feed. Suitable volumetric space velocities for slurry hydroconversion can range, for example, from about 0.05 hr$^{-1}$ to about 5 hr$^{-1}$, such as about 0.1 hr$^{-1}$ to about 2 hr$^{-1}$. Suitable treat gas rates can be from 2000 SCF/bbl (~340 Nm$^3$/m$^3$) to about 30000 SCF/bbl (~5100 Nm$^3$/m$^3$). A slurry reactor can include at least one feed inlet for receiving a (slurry) feedstock and at least one reactor outlet for a hydroconverted (or otherwise hydroprocessed) slurry effluent.

The reaction conditions for slurry hydroconversion can additionally or alternatively be selected such that the net conversion of feed across all slurry hydroconversion reactors (if more than one are arranged in series) can be at least about 80%, such as at least about 90% or at least about 95%, and optionally up to about 100%. For slurry hydroconversion, conversion is defined as conversion of compounds with boiling points greater than a conversion temperature, such as 975° F. (~524° C.), to compounds with boiling points below the conversion temperature. The portion of a heavy feed unconverted after slurry hydroconversion can be referred to as pitch or a bottoms fraction from the slurry hydroconversion.

Slurry Hydroprocessing of Heavy Oil Feeds: Slurry Hydroprocessing Catalyst Recovery System In certain aspects, the slurry hydroprocessing catalyst can be recovered from the hydroprocessing system utilizing a cross-flow filter, a cyclone or other separator drum, or a combination thereof. In such aspects, when a cyclone separator and/or cross-flow filter is utilized in a slurry hydroprocessing system, either individually or in combination, catalyst recovery (for particles larger than ~2 μm) can be at least about 90%, e.g., at least about 95%, at least about 98%, or at least about 99%, and optionally up to about 100%. In particular, using a cyclone separator followed by a cross-flow filter can allow recovery of at least about 99% of particles larger than ~2 μm, e.g., at least about 99.5% or at least about 99.8%, such as up to about 100%.

Generally, a cyclone separator (or other drum-type separator) can be oriented to have a horizontal or vertical principal axis. Vertical drums can require smaller footprint in a refinery, but horizontal drums can be smaller in volume relative to the volume of liquid processed per time. A cyclone separator can allow for return of slurry catalyst to a slurry hydroprocessing reactor without requiring drying and/or regeneration of the slurry catalyst prior to recycle. The slurry catalyst can be concentrated in a liquid, such as a portion of the slurry effluent exiting from the drum along with the slurry catalyst, to allow the recycled slurry catalyst to be pumped back into the process in the slurry reactor. If the solids concentration exiting from the drum separator is high, a liquid slip stream from the cyclone separator and/or from fresh feed can be used to achieve a desirable mix of liquid to solid for pumping.

For example, a vertical cyclone can be used as a drum separator for separating slurry catalyst from the effluent of a slurry reactor. Optionally, a plurality of vertical cyclones can be used for separation, with the overhead flow from a first cyclone being used as an input flow to the second cyclone. In addition to cyclone components described below, a vertical cyclone can also include any conventional components that can be used for cyclone separators in a refinery or chemicals production setting. A vertical cyclone can have at least one tangential inlet for receiving a mixed gas/liquid/solid phase effluent from a slurry reactor. The cyclone can allow for separation of a lower density fraction (gas plus potentially some liquid plus catalyst fines and other small catalyst particles) from a higher density fraction (larger catalyst particles plus some liquid). The tangential inlet(s) can introduce the input flow in a tangential manner into the vertical cyclone. The tangential inlet(s) can introduce the input flow below an annular ring that can assist with disengaging the lower density fraction of the slurry effluent input flow from the higher density fraction. The cyclone can be operated at a temperature above standard, so the lower density fraction of the input flow can potentially include "gas phase" components with boiling points substantially above 25° C. The lower density fraction of the input flow can be separated and then can exit at or near the top of the cyclone, such as via a lower density outlet. In aspects where both a cyclone separator and a cross-flow filter are used, the lower density fraction can be used as the input to the cross-flow filter. The higher density fraction (liquid and solid portion) can travel down the cyclone and eventually exit through a bottom dipleg, which corresponds to a higher density outlet. Optionally, a lower portion (or lower portions) of the cyclone can include one or more structures for disrupting the flow within the cyclone, such as anti-swirl baffles and/or anti-vortex baffles. These structures can assist with allowing solid particles to continue traveling down the cyclone to exit, as opposed to having the solid particles held up within a fluid flow in the body of the cyclone. The higher density fraction can exit from the bottom of the cyclone. At least a first portion of the higher density fraction can be recycled back to the slurry hydroprocessing reaction, while a second portion can be purged to allow for catalyst regeneration.

When used in combination in a catalyst recovery system, the lower density outlet from the final cyclone separator (or other drum separator) in the catalyst recovery system can be in direct fluid communication with the cross-flow filter. The effluent from the cross-flow filter can then be passed into a product recovery separation stage. In this type of configuration, the final cyclone separator in the catalyst recovery system can be referred to as being in indirect fluid communication with the product recovery separation stage via the cross-flow filter. It is noted that references to fluid communication between two components can refer to either direct or indirect fluid communication unless otherwise specified.

Generally, a cross-flow filter can include a metal membrane material, such as a sintered matrix of fine stainless steel powder within a porous structure of woven stainless steel wire mesh. The fine stainless steel powder can provide filtration down to about 0.1 μm, about 0.5 μm, about 1 μm, or about 2 μm. The woven wire mesh support structure can be strong yet thin enough to permit this membrane to be pleated into high area filter elements, thereby minimizing resistance to flow. An example of a suitable shape for a cross-flow filter can be a (circular) cylinder, or another convenient shape that can allow a feed to surround the filter and pass through the filter membrane to an interior or core volume. The particles to be filtered, such as catalyst particles, can be retained on the exterior of the filter membrane as the feed passes into the interior or core volume. In various other aspects, the filter can include a porous membrane comprising a polymeric, ceramic, and/or carbon material. Examples of suitable commercially available membrane are available from Pall, such as AccuSep® inorganic membrane filters.

In various aspects, the filter can receive a slurry hydroprocessing product effluent from a slurry reactor, where at least a portion of the catalyst in the slurry hydroprocessing product effluent can be filtered out and returned to a feed line entering the slurry reactor. The liquid product passing out of the filter can be sent to downstream product processing.

An example of a suitable filter system can be a backwash filter capable of self-cleaning. In operation, after a predetermined pressure drop across the filter membrane is detected and/or at a specific time interval, reversing the flow of the system can cause the discharge of the collected solids, e.g., catalyst particles, to a recovery location.

During operation, a cross-flow filter can operate by having feed pass from the exterior of the cross-flow filter to an interior or core volume of the cross-flow filter. The liquid entering the interior of the cross-flow filter can then exit along the long axis of the filter. The catalyst particles can be retained on the exterior of the filter membrane as the feed passes through into the interior or core volume. During a backwash, a wash fluid (such as product that previously passed through the filter) can be returned to the interior or core volume and pressurized sufficiently to pass through the membrane to the exterior of the filter. This can remove catalyst particles deposited on the filter membrane. The backwash fluid containing the catalyst particles can then, for example, be combined with fresh feed for slurry hydroprocessing. Additionally or alternately, at least a portion of the backwash containing the catalyst particles can be purged from the system.

Figure 2:
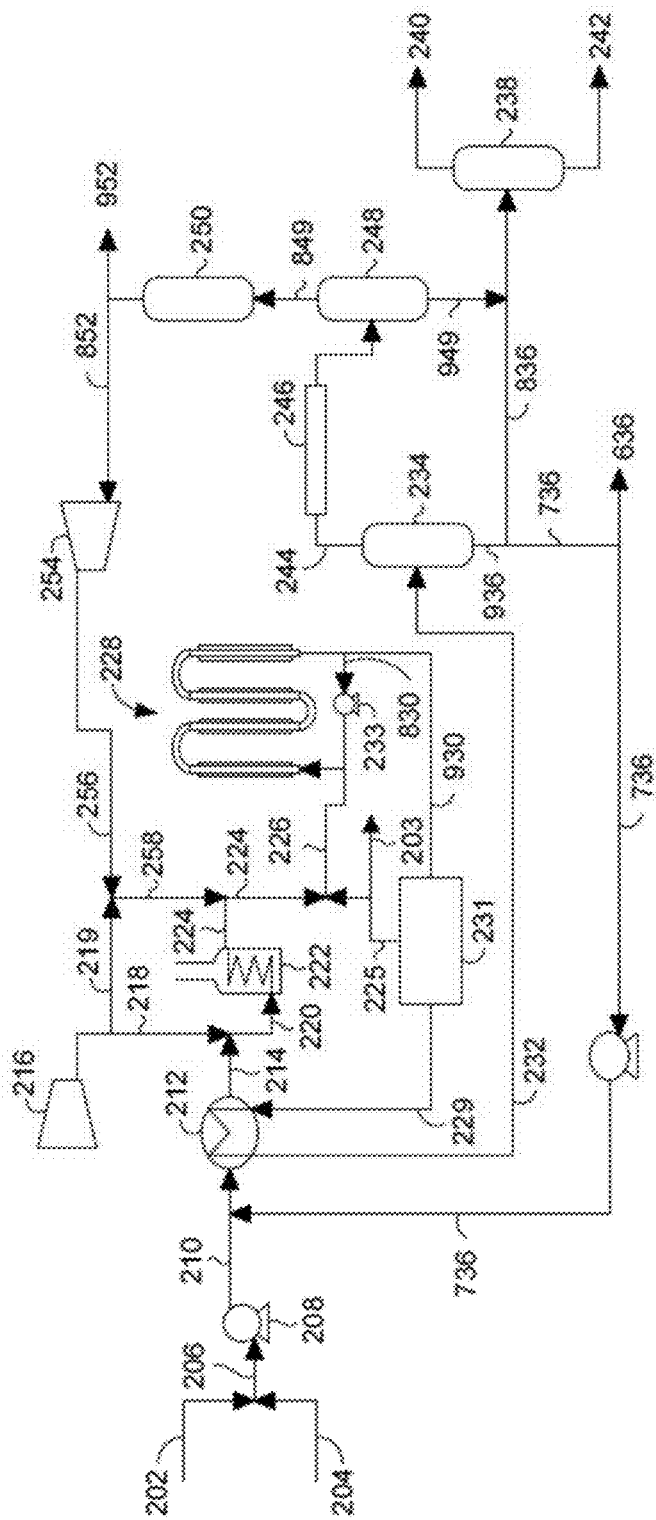
FIG. 2 shows another exemplary configuration of a slurry hydroprocessing system that includes a catalyst filter recovery unit.

FIG. 2 depicts one exemplary configuration of a slurry hydroprocessing system incorporating the hydroprocessing catalyst recovery system. The feed 202 (such as a heavy oil feed as described herein) can be combined with a slurry hydroprocessing catalyst 204 to form a slurry stream 206. In some aspects, the amount of slurry hydroprocessing catalyst 204 can be sufficient to replace catalyst removed from the system via catalyst purge stream 203. The slurry stream 206 can enter a feed pump 208, and the pressurized slurry stream 210 can then be passed into a heat exchanger 212. The heat exchanger 212 can be any conventional type of heat exchanger utilized in a refinery for exchanging heat between pressurized slurry stream 210 and the hydroprocessed effluent 229. The heated slurry stream 214 can be mixed with a make-up hydrogen stream 218 from a hydrogen source 216 forming a hydrogen-containing slurry stream 220 that can be exposed to further heat in a heater 222. The hydrogen stream and the slurry stream can be heated in independent heaters or can use one heater with two independent paths (one for the gas and one for liquid slurry stream) or can use one path for the combined slurry and gas streams. The heated hydrogen-containing slurry stream 224 can be mixed with a recovered catalyst stream 225 from the catalyst recovery system 231, which can include a cyclone separator (and/or other drum separator), a cross-flow filter, or a combination thereof. The heated hydrogen-containing slurry stream 224 can also be mixed with a recycled portion 830 of the hydroprocessing effluent. The mixing with recycled portion 830 can occur prior to, during, and/or after mixing with the recovered catalyst stream 225. Optionally, a portion of the recovered catalyst stream 225 can be removed from the system as a catalyst purge stream 203 prior to mixing with recycled portion 830, to allow for regeneration of catalyst. The resulting combined stream 226 can then enter a slurry reactor 228 via a feed inlet. The slurry reactor 228 can include any conventional type of slurry reactor used in a refinery. Examples of suitable types of slurry reactors are described in connection with FIGS. 4 and 5. The portion 830 of the reactor effluent can be recycled to form part of combined stream 226 via pump 233. After exiting from a reactor outlet, a portion 930 of the hydroprocessed effluent can be sent to the catalyst recovery system 231 for removal of a portion of the catalyst into a catalyst stream 225. The liquid portion of the product effluent 930 leaving the catalyst recovery system 231 can be passed through heat exchanger 212 on the way to being exposed to a series of separations. The series of separations can be referred to as a product recovery separation stage. For example, the liquid portion of the product effluent can be exposed to a HPHT separator 234 to be separated into a lighter boiling fraction 244 (such as a ~566° C.-fraction or a ~538° C.-fraction) and a heavier boiling fraction 936. The lighter boiling fraction 244 can be exposed to a condenser 246 to be cooled and then the cooled fraction can then be exposed to a HPLT separator 248. The lighter boiling fraction 849 exiting the HPLT separator 248 can then be exposed to an amine scrubber 250 to remove a portion of the $H_2S$. A portion of the scrubbed lighter boiling fraction can be purged 952, while another portion 852 can be sent to a gas recycle compressor 254 to form a compressed gas stream 256 that can include hydrogen, which can then be mixed with the make-up hydrogen stream 219 to form a combined gas stream 258 that can then be combined with the heated hydrogen-containing feed 224. It is noted that, in some configurations, only one of make-up hydrogen stream 218 and make-up hydrogen stream 219 may be employed. Optionally, a portion 736 of the heavier boiling fraction 936 can be combined with pressurized slurry stream 210. Another portion 636 of the heavier boiling fraction can be removed from the system as unconverted pitch. Still another portion 836 of the heavier boiling fraction 936 can be combined with the heavier boiling fraction 949 of the HPLT separator 248 and then exposed to a LPLT separator 238. The heavier boiling fraction 242 from the LPLT separator 238 can comprise, for example, a ~1000° F.+(~538° C.+) or a ~1050° F.+(~566° C.+) portion sent to a vacuum resid unit or another unit for processing of unconverted pitch. The lighter boiling fraction 240 from the LPLT separator 238 can comprise vacuum gas oil and lower boiling range compounds that can be suitable for further processing to form fuels, lubricants, and/or other products.

Figure 4:
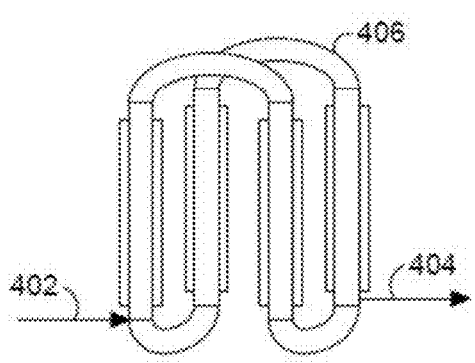
FIG. 4 shows an example of a slurry reactor suitable for use in the slurry hydroprocessing systems of FIGS. 2 and 3.
Figure 5:
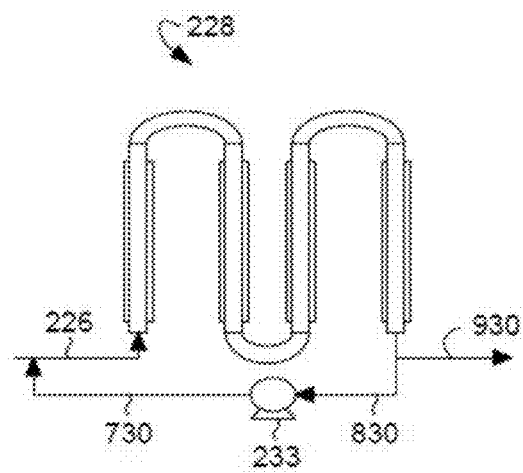
FIG. 5 shows another example of a slurry reactor suitable for use in the slurry hydroprocessing systems of FIGS. 2 and 3.

FIGS. 4 and 5 show two examples of loop type reactors for performing slurry hydroprocessing. FIG. 5 shows the type of reactor schematically represented in FIG. 2. In FIG. 5, the loop reactors are arranged in series. This can be a configuration suitable when the amount of effluent recycle is lower. In this type of configuration, a first portion of the hydroprocessed effluent 930 can be removed for handling as a product, while a second portion 830 can optionally be compressed 233 to form recycle portion 730. The recycle portion 730 can be combined with feed 226 at any convenient location relative to any other streams combined prior to entry into reactor 228. FIG. 4 shows an alternative configuration where the loop reactors 406 are connected to form a continuous loop. The configuration in FIG. 4 can be suitable when a large amount of recycle is desired, with only a small portion 404 of hydroprocessed effluent being generated after each loop of feed 402 through the loop reactors 406.

Slurry Hydroprocessing with Demetallization

Although slurry hydroconversion can allow for exchange and/or withdrawal of catalyst during operation to allow for introduction of fresh catalyst, it can also be beneficial to perform demetallization of a feed for slurry hydroconversion. This can allow a less expensive demetallization catalyst to be used to remove metals from a feedstock, thus reducing or minimizing the fresh catalyst addition rate for a subsequent slurry hydroconversion catalyst.

In this type of aspect, any convenient type of demetallization catalyst can be used that is suitable for use in a slurry hydroprocessing environment. This can include using a demetallization catalyst with a particle size of about 2 µm to about 500 µm, e.g., about 20 µm to about 500 µm or about 20 µm to about 100 µm. In addition to the hydrodemetallation and/or demetallization catalysts described below, examples of suitable demetallization catalysts can include, but are not limited to, catalysts including Co/Mo, Ni/Mo, and/or V on a support such as a porous carbon or porous alumina support, or spent catalyst from a fluid catalytic cracking process. The amount of demetallization catalyst in a slurry demetallization environment can range from about 50 wppm to about 50000 wppm (i.e., ~5 wt %), for example about 100 wppm to about 20000 wppm, about 100 wppm to about 10000 wppm, about 500 wppm to about 10000 wppm, or about 1000 wppm to about 10000 wppm.

When performing a demetallization under slurry hydroprocessing conditions, the demetallization can be performed under lower pressure conditions as compared to conventional slurry hydroprocessing conditions. Demetallization under slurry hydroprocessing conditions can be performed at a pressure of about 300 psig (~2.1 MPag) to about 800 psig (~5.6 MPag), e.g., about 400 psig (~2.8 MPag) to about 800 psig (~5.6 MPag), or about 300 psig (~2.1 MPag) to about 700 psig (~4.9 MPag), or about 400 psig (~2.8 MPag) to about 700 psig (~4.9 MPag). Demetallization under slurry hydroprocessing conditions can be performed at a temperature of about 600° F. (~316° C.) to about 1000° F. (~538° C.), e.g., about 700° F. (~371° C.) to about 1000° F. (~538° C.), about 600° F. (~316° C.) to about 900° F. (~482° C.), about 700° F. (~371° C.) to about 900° F. (~482° C.), about 600° F. (~316° C.) to about 850° F. (~454° C.), or about 600° F. (~316° C.) to about 850° F. (~454° C.). Suitable volumetric space velocities for slurry hydroconversion can range, for example, from about 0.05 $hr^{-1}$ to about 5 $hr^{-1}$, such as about 0.1 $hr^{-1}$ to about 2 $hr^{-1}$. Suitable treat gas rates can be from 1000 SCF/bbl (~170 $Nm^3/m^3$) to about 20000 SCF/bbl (~3400 $Nm^3/m^3$), and optionally but preferably less than 10000 SCF/bbl (~1700 $Nm^3/m^3$). Under these conditions, the amount of demetallization (relative to the weight of metal in the feed) can be at least about 60 wt % and up to about 100 wt %, such as from about 60 wt % to about 90 wt %. The amount of hydrogen consumption during demetallization under slurry hydroconversion conditions can be relatively low, such as about 100 SCF/bbl (~17 $Nm^3/m^3$) to about 500 SCF/bbl (~85 $Nm^3/m^3$) or about 100 SCF/bbl (~17 $Nm^3/m^3$) to about 300 SCF/bbl (~51 $Nm^3/m^3$).

Configuration for Demetallization with Slurry Hydroconversion

Figure 3:
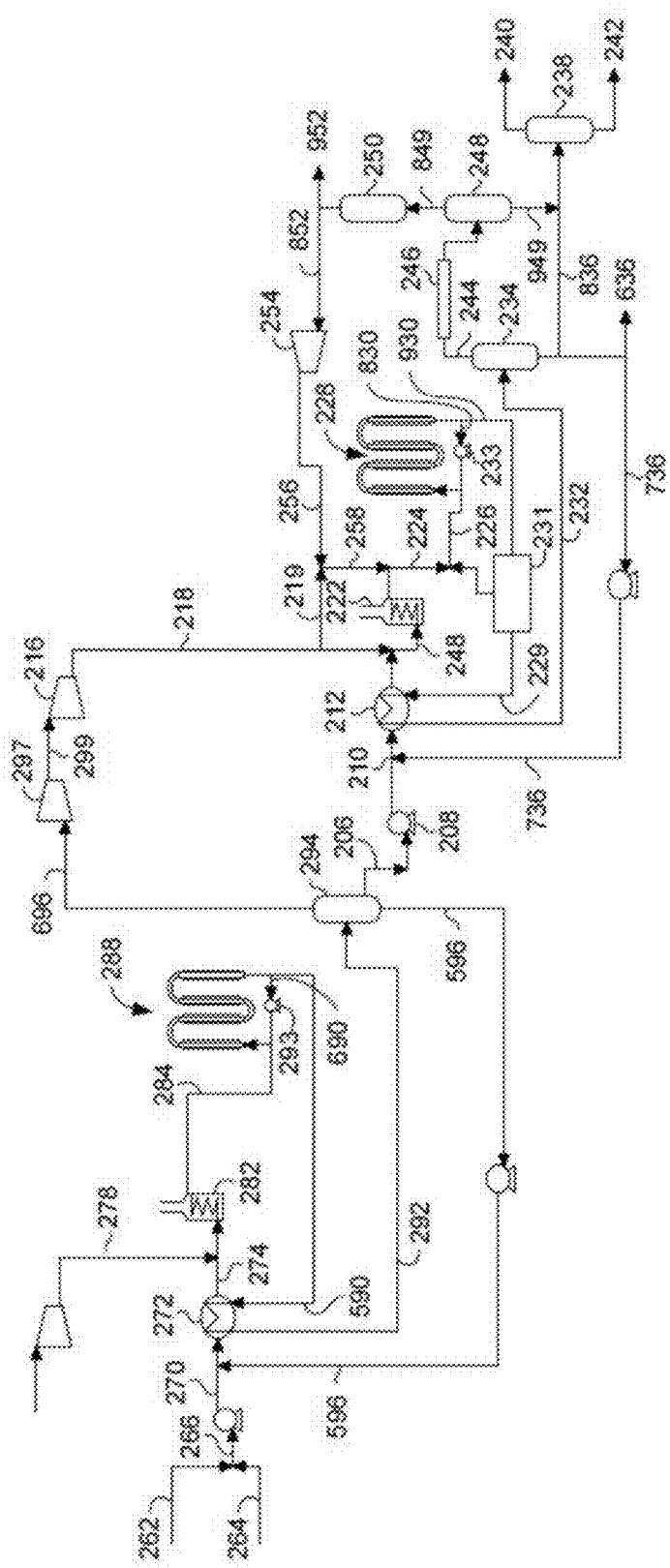
FIG. 3 shows an expanded slurry hydroprocessing system that includes a demetallization stage.

FIG. 3 shows an example of a reaction configuration including demetallization under slurry hydroprocessing conditions prior to hydroconversion. In the configuration shown in FIG. 3, elements similar to the configuration in FIG. 2 have similar numbers. In addition to elements shown in FIG. 2, in a configuration similar to FIG. 3 a feed 262 (such as a heavy oil feed as described herein) can be combined with a slurry hydroprocessing catalyst 264 to form a slurry stream 266. The slurry stream 266 can enter a feed pump, and the pressurized slurry stream 270 can then be passed into a heat exchanger 272. The heated slurry stream 274 can be mixed with a hydrogen stream 278 to form a hydrogen-containing slurry stream that can be exposed to further heat in a heater 282. The heated hydrogen-containing slurry stream 284 can be mixed with a recovered catalyst stream from a catalyst recovery system 231, which can include a cyclone separator (and/or other drum separator), a cross-flow filter, or a combination thereof. Although not shown in FIG. 3, a catalyst purge stream can be separated from the recovered catalyst stream to allow for removal of catalyst from the system. The heated hydrogen-containing slurry stream 284 can additionally or alternatively be mixed with a recycled portion 690 of the demetallized effluent. The mixing with recycled portion 690 can occur prior to, during, and/or after mixing with the recovered catalyst stream. The portion 690 of the demetallized effluent can be recycled via pump 293. It is noted that the demetallized effluent 293 can correspond to a slurry of liquid and solid (catalyst particles). Pumps for pumping of liquid/solid slurry can be mechanically capable to have normal operation in contact with liquid and solid materials. The resulting combined stream can then enter a slurry reactor 288 for performing demetallization under slurry conditions. The slurry reactor 288 can include any conventional type of slurry reactor used in a refinery. Examples of suitable types of slurry reactors are described in connection with FIGS. 4 and 5. A portion 930 of the hydroprocessed effluent can be sent to the catalyst recovery filter system (not shown) for removal of at least a portion of the demetallization catalyst. The liquid portion of the demetallized effluent 930, after any optional initial removal of demetallization catalyst, can be passed through heat exchanger 272 on the way to being exposed to a series of separations. In FIG. 3, the separations can be represented by separator 294, which can separate the demetallized effluent into a lower boiling portion 696, a recycled portion 596, and a demetallized feedstock 206 that can be passed into the hydroconversion portion of the configuration. The lower boiling portion 696 can, for example, correspond to a gas phase portion that contains sufficient hydrogen to be suitable for further use in hydroprocessing. This gas phase portion can be compressed 297 to form a hydrogen-containing stream 299 suitable for introduction into the hydroconversion portion of the configuration. Optionally, separator 294 can also include a catalyst separation stage for removing demetallization catalyst from demetallized feedstock 206 prior to entry into the hydroconversion portion of the configuration.

In an alternative aspect, it is noted that a hybrid configuration could be used so that demetallization can be performed in a fixed bed reactor environment followed by slurry hydroprocessing.

Co-processing with a High Solvency Dispersive Power (HSDP) Crude Component

In various aspects, the hydroprocessing of a heavy oil feed component can be facilitated by adding a high solvency dispersive power crude component. High Solvency Dispersive Power (HSDP) crudes are a subset of crudes that can have a combination of properties corresponding to a high TAN, a high aromaticity, and/or a high Solubility Blending Number (SBN). Optionally, a HSDP crude or crude component can also have a relatively low content of metals, such as Ni, V, and/or Fe. Such crudes can be effective for mitigating the formation of fouling deposits in refinery crude preheat trains (CPHTs) and/or in performing online cleaning and removing existing deposits for fouled CPHT heat exchangers. Such HSDP crudes can also be effective in mitigating the coking deactivation of catalysts during hydroprocessing.

It has been discovered that the improved solvency power of HSDP crudes can be based in part on an improved solvency power of the vacuum resid fraction (~800° F.+ or ~427° C.+) of such crudes. In some aspects, an HSDP crude component or fraction can include or correspond to residuum from one or more refinery distillation processes performed on an HSDP crude, such as atmospheric or vacuum distillation processes.

An HSDP crude component can have a boiling range similar to the boiling ranges noted above for other types of heavy oils. Thus, HSDP crude components can have an initial ASTM D2887 boiling point, or 5% distillation point (T5), or 10% distillation point (T10), of ~650° F. (~343° C.) or greater. Preferably, an HSDP crude component can have an ASTM D2887 10% distillation point of at least ~650° F. (~343° C.), alternatively at least ~660° F. (~349° C.) or at least ~750° F. (~399° C.). In some aspects, the ASTM D2887 10% distillation point can be still greater, such as at least ~950° F. (~510° C.), at least ~1020° F. (~549° C.), or at least ~1050° F. (~566° C.). An HSDP crude component can also have sulfur and nitrogen contents comparable to other heavy oils.

An HSDP crude component can have a high TAN relative to the TAN of a typical heavy oil feed. In certain aspects, the HSDP crude component can have a TAN of at least about 0.3 mg of KOH per g of HSDP crude component, e.g., at least about 0.5, at least about 1.0, at least about 1.5, at least about 2.0, or at least about 4.0, such as up to about 10 or more.

In some aspects, an HSDP crude component can also have a relatively low total nickel, vanadium, and/or iron content relative to a typical heavy oil. For example, an HSDP crude component can contain about 1 wppm to about 40 wppm of Ni/V/Fe per weight of HSDP crude component, on a total elemental basis of nickel, vanadium, and iron, such as about 1 wppm to about 30 wppm or about 1 wppm to about 20 wppm.

An HSDP crude component can also be characterized based on aromatics content. For example, an HSDP crude component can have at least about 50 wt % aromatic compounds, e.g., at least about 60 wt %, at least about 70 wt %, at least about 80 wt %, about 50 wt % to about 90 wt %, about 60 wt % to about 90 wt %, about 70 wt % to about 90 wt %, or about 80 wt % to about 90 wt %.

In one or more aspects, the HSDP crude component can have a high blending solubility number (SBN). In such aspects, the SBN of the HSDP crude component can be at least about 75, e.g., at least about 85, at least about 100, at least about 120, at least about 130; about 75 to about 150, about 85 to about 150, about 100 to about 150, about 120 to about 150, or about 130 to about 150. The Solubility Blending Number is determined according to the method described in U.S. Pat. No. 5,871,634, which is incorporated herein by reference with regard to the subject matter related to this specific purpose.

Briefly, the determination of the Insolubility Number and the Solubility Blending Number for a petroleum oil containing asphaltenes can require testing the solubility of the oil in test liquid mixtures at the minimum of two volume ratios of oil to test liquid mixture. The test liquid mixtures can be prepared by mixing two liquids in various proportions. One liquid can be nonpolar and a solvent for the asphaltenes in the oil while the other liquid can be nonpolar and a nonsolvent for the asphaltenes in the oil. Since asphaltenes are defined as being insoluble in n-heptane and soluble in toluene, it can be quite convenient to select the same n-heptane as the nonsolvent for the test liquid and toluene as the solvent for the test liquid. Although the selection of many other test nonsolvents and test solvents can be made, their use is believed to provide no better definition of the preferred oil blending process than the use of n-heptane and toluene described here.

A convenient volume ratio of oil to test liquid mixture can be selected for the first test, for instance, 1 mL of oil to 5 mL of test liquid mixture. Then various mixtures of the test liquid mixture can be prepared by blending n-heptane and toluene in various known proportions. Each of these can be mixed with the oil at the selected volume ratio of oil to test liquid mixture. Then it can be determined for each of these if the asphaltenes are soluble or insoluble. Any convenient method might be used. One possibility can be to observe a drop of the blend of test liquid mixture and oil between a glass slide and a glass cover slip using transmitted light with an optical microscope at a magnification from 50× to 600×. If the asphaltenes are in solution, few, if any, dark particles should be observable. If the asphaltenes are insoluble, many dark, usually brownish, particles, usually 0.5 to 10 microns in size, should be observable. Another possible method can be to put a drop of the blend of test liquid mixture and oil on a piece of filter paper and let dry. If the asphaltenes are insoluble, a dark ring or circle should be seen about the center of the yellow-brown spot made by the oil. If the asphaltenes are soluble, the color of the spot made by the oil should be relatively uniform. The results of blending oil with all of the test liquid mixtures can be ordered according to increasing percent toluene in the test liquid mixture. The desired value can be between the minimum percent toluene dissolving asphaltenes and the maximum percent toluene precipitating asphaltenes. More test liquid mixtures can be prepared with percent toluene in between these limits, blended with oil at the selected oil to test liquid mixture volume ratio, and determined if the asphaltenes are soluble or insoluble. The desired value should be between the minimum percent toluene dissolving asphaltenes and the maximum percent toluene precipitating asphaltenes. This process can be continued until the desired value is determined within the desired accuracy. Finally, the desired value can be taken to be the mean of the minimum percent toluene dissolving asphaltenes and the maximum percent toluene precipitating asphaltenes. This can be the first datum point, $T_1$, at the selected oil to test liquid mixture volume ratio, $R_1$. This test is called the toluene equivalence test.

The second datum point can be determined by the same process as the first datum point, only by selecting a different oil to test liquid mixture volume ratio. Alternatively, a percent toluene below that determined for the first datum point can be selected and that test liquid mixture can be added to a known volume of oil until asphaltenes just begin to precipitate. At that point the volume ratio of oil to test liquid mixture, $R_2$, at the selected percent toluene in the test liquid mixture, $T_2$, can become the second datum point. Since the accuracy of the final numbers can increase the further apart the second datum point may be from the first datum point, the preferred test liquid mixture for determining the second datum point can be 0% toluene or 100% n-heptane. This test is called the heptane dilution test.

The Insolubility Number, $I_N$, is given by:

$$I_N = T_2 - \left[\frac{T_2 - T_1}{R_2 - R_1}\right] R_2, \quad (1)$$

and the Solubility Blending Number, $S_{BN}$, is given by:

$$S_{BN} = I_N \left[1 + \frac{1}{R_2}\right] - \frac{T_2}{R_2}. \quad (2)$$

In various aspects, the HSDP crude component can be combined with the heavy hydrocarbon oil component to effectively increase run length during hydroprocessing. For example, the HSDP crude component and heavy hydrocarbon component can be combined so as to produce a combined feedstock comprised of about 10 wt % to about 90 wt % of the heavy hydrocarbon oil component and from about 90 wt % to about 10 wt % of the HSDP crude component, based on total weight of the combined feed. Alternatively, the HSDP crude component and heavy hydrocarbon component can be combined so as to produce a combined feedstock that is comprised of about 30 wt % to about 80 wt % of the heavy hydrocarbon oil component and about 70 wt % to about 20 wt % of the HSDP crude component, based on total weight of the combined feed. In some aspects, the HSDP crude component can be about 50 wt % or less of the combined feedstock, such as about 40 wt % or less, about 30 wt % or less, or about 20 wt % or less.

Another way of characterizing an amount of heavy oil feed relative to an amount of the HSDP crude component can be as a ratio of feedstock to HSDP crude component. For example, the ratio of the heavy oil feed relative to the HSDP crude component on a weight basis can be from about 0.3 to about 6.0, such as at least about 0.5 and/or at most about 5.0 or at most about 3.0. In particular, the ratio of the heavy oil feed relative to the HSDP crude component on a weight basis can be about 0.3 to about 6.0, e.g., about 0.5 to about 5.0 or about 0.3 to about 3.0.

The HSDP crude component can be combined with the heavy hydrocarbon oil within a hydroprocessing vessel or a hydroprocessing zone. Alternatively, the HSDP crude component and heavy oil feed can be supplied as separate streams and combined into one feed stream prior to entering a hydroprocessing vessel or a hydroprocessing zone.

In certain aspects, a conventional hydroprocessing solvent may be added to the combined feedstock. For example, in one aspect, a solvent containing at least one single-ring aromatic ring compound, and preferably more than one single-ring aromatic ring compound, may be utilized. The solvent may be a low boiling solvent relative to the heavy oil feed. By the term "single-ring aromatic compound", as used herein, is meant a hydrocarbon compound containing only one cyclic ring that is aromatic in nature.

For a solvent component containing at least one single-ring aromatic compound, the solvent can advantageously have an ASTM D2887 90% distillation point of less than ~300° C. (~572° F.). Alternatively, the solvent can have an ASTM D2887 90% distillation point of less than ~250° C. (~482° F.), e.g., less than ~200° C. (~392° F.). Additionally or alternately, the solvent can have an ASTM D2887 10% distillation point of at least ~120° C. (~248° F.), such as at least ~140° C. (~284° F.) or at least ~150° C. (~302° F.).

Additionally or alternatively, the solvent can correspond to a recycle stream of a portion of the liquid effluent or product generated from the hydroprocessing reaction. The recycle stream can be a portion of the total liquid effluent, or the recycle stream can include a portion of one or more distillation fractions of the liquid product from hydroprocessing. An example of a recycle stream corresponding to a portion of a distillation fraction is a recycle stream corresponding to a portion of the distillate boiling range product from hydroprocessing of the heavy oil feed.

Hydroprocessing Catalysts—Solvent Assisted Hydroprocessing

The catalysts used for hydroconversion of a heavy oil feed can include conventional hydroprocessing catalysts, such as those that comprise at least one Group VIII non-noble metal (Groups 8-10 of IUPAC periodic table), such as including at least Fe, Co, and/or Ni, for example including at least Co and/or Ni; and at least one Group VI metal (Group 6 of IUPAC periodic table), such as Mo and/or W. The metals can typically be present (or approximated as being present) as oxides or precursors that can form oxides, although it is likely that they can subsequently be converted to sulfides, in which form they are typically known to be active in hydroprocessing reactions. As such, hydroprocessing catalysts can optionally include transition metal sulfides impregnated/dispersed on a refractory support or carrier such as alumina and/or silica. The support or carrier itself can typically have little or no significant/measurable catalytic activity. Substantially carrier- or support-free catalysts, commonly referred to as bulk catalysts, can generally have higher volumetric activities than their supported counterparts.

The catalysts can either be in bulk form or in supported form. Additionally or alternatively to alumina and/or silica, other suitable support/carrier materials can include, but are not limited to, zeolites, titania, silica-titania, and titania-alumina. It is within the scope of the invention that more than one type of hydroprocessing catalyst can be used in one or multiple reaction vessels.

The at least one Group VIII non-noble metal, in oxide form, can typically be present in an amount ranging from about 2 wt % to about 30 wt %, e.g., from about 4 wt % to about 15 wt %. The at least one Group VI metal, in oxide form, can typically be present in an amount ranging from about 2 wt % to about 60 wt %, e.g., from about 6 wt % to about 40 wt % or from about 10 wt % to about 30 wt %. These weight percents are based on the total weight of the catalyst. It is noted that, under hydroprocessing conditions, the metals may be present as metal sulfides and/or may be converted to metal sulfides prior to performing hydroprocessing on an intended feed.

A vessel or hydroprocessing zone in which catalytic activity occurs can include one or more hydroprocessing catalysts. Such catalysts can be mixed or stacked, with the catalyst optionally but preferably being in a fixed bed in the vessel or hydroprocessing zone. In such aspects, the fixed bed reactor can be operated under continuous-gas-phase conditions, such as trickle-bed conditions. In other aspects, solvent assisted hydroprocessing can be performed using an alternative configuration, such as an ebullating bed or slurry reactor.

The support can be impregnated with the desired metals to form the hydroprocessing catalyst. In particular impregnation embodiments, the support is heat treated at temperatures in a range from ~400° C. to ~1200° C. (~752° F. to ~2192° F.), e.g., from ~450° C. to ~1000° C. (~842° F. to ~1832° F.) or from ~600° C. to ~900° C. (~1112° F. to ~1652° F.), prior to impregnation with the metals.

In an alternative embodiment, the hydroprocessing catalyst can comprise shaped extrudates. The extrudate diameters can range from $1/32^{nd}$ to $1/8^{th}$ inch, e.g., from $1/20^{th}$ to $1/10^{th}$ inch or from $1/20^{th}$ to $1/16^{th}$ inch. The extrudates can be cylindrical or shaped. Non-limiting examples of extrudate shapes can include trilobes and/or quadralobes.

The process of the invention can be effectively carried out using a hydroprocessing catalyst having any median pore diameter effective for hydroprocessing the heavy oil component. For example, the median pore diameter can be in the range from ~30 to ~1000 Å (Angstroms), e.g., ~50 to ~500 Å, ~60 to ~300 Å, ~50 Å to ~200 Å, ~180 to ~500 Å, or ~200 to ~300 Å. Pore diameter can be determined according to ASTM Method D4284-07 involving Mercury Porosimetry.

In some aspects, the hydroprocessing catalyst can have a pore size distribution not so broad as to negatively impact catalyst activity or selectivity. For example, the hydroprocessing catalyst can have a pore size distribution in which at least 60% of the pores have a pore diameter within ~45 Å, e.g., within ~35 Å or within ~25 Å, of the median pore diameter. In particular, the catalyst can have a median pore diameter in a range from ~50 to ~180 Å, such as from ~60 to ~150 Å, with at least 60% of the pores having a pore diameter within ~45 Å, ~35 Å, or ~25 Å of the median pore diameter.

Pore volume can advantageously be sufficiently large to further contribute to catalyst activity or selectivity. For example, the hydroprocessing catalyst can have a pore volume of at least about 0.3 $cm^3/g$, e.g., at least about 0.7 $cm^3/g$ or at least about 0.9 $cm^3/g$. In certain embodiments, pore volume can range from about 0.3 $cm^3/g$ to about 1.0 $cm^3/g$, about 0.4 $cm^3/g$ to about 0.8 $cm^3/g$, or about 0.5 $cm^3/g$ to about 0.7 $cm^3/g$.

In certain aspects, the catalyst can exist in shaped forms, for example, pellets, cylinders, and/or extrudates. The catalyst can typically have a flat plate crush strength in a range of about 50 N/cm to about 500 N/cm, e.g., about 60 N/cm to about 400 N/cm, about 100 N/cm to about 350 N/cm, about 200 N/cm to about 300 N/cm, or about 220 N/cm to about 280 N/cm.

In some aspects, a combination of catalysts can be used for hydroprocessing of a heavy oil feed. For example, a heavy oil feed can be contacted first by a demetallization catalyst, such as a catalyst including NiMo or CoMo on a support with a median pore diameter of ~200 Å or greater. A demetallization catalyst can represent a lower activity catalyst effective for removing at least a portion of the metals content of a feed. This can allow a less expensive catalyst to be used to remove a portion of the metals, thus extending the lifetime of any subsequent higher activity catalysts. The demetallized effluent from the demetallization process can then be contacted with a hydroprocessing catalyst.

Solvent Assisted Hydroprocessing Conditions

Hydroprocessing (alternatively hydroconversion) generally refers to treating or upgrading the heavy hydrocarbon oil component that contacts the hydroprocessing catalyst. Hydroprocessing particularly refers to any process carried out in the presence of hydrogen, including, but not limited to, hydroconversion, hydrocracking (which includes selective hydrocracking), hydrogenation, hydrotreating, hydrodesulfurization, hydrodenitrogenation, hydrodemetallation, hydrodearomatization, hydroisomerization, and hydrodewaxing including selective hydrocracking. The hydroprocessing reaction can be carried out in a vessel or a hydroprocessing zone in which heavy hydrocarbon and solvent contact the hydroprocessing catalyst in the presence of hydrogen.

Contacting conditions in the contacting or hydroprocessing zone can include, but are not limited to, temperature, pressure, hydrogen flow, hydrocarbon feed flow, or combinations thereof. Contacting conditions in some embodiments are controlled to yield a product with specific properties.

Hydroprocessing can be carried out in the presence of hydrogen. A hydrogen stream can, therefore, be fed or injected into a vessel or reaction zone or hydroprocessing zone in which the hydroprocessing catalyst is located. Hydrogen, such as contained in a hydrogen "treat gas," can be provided to the reaction zone. Treat gas, as referred to herein, can be either pure $H_2$ or a hydrogen-containing gas, which is a gas stream containing hydrogen in an amount sufficient for the intended reaction(s), optionally including one or more other gases (e.g., nitrogen and/or light hydrocarbons such as methane), and which can advantageously not adversely interfere with or affect either the reactions or the products. Impurities, such as $H_2S$ and $NH_3$, can typically be undesirable and can typically be removed from the treat gas before being conducted to the reactor. The treat gas stream introduced into a reaction stage can preferably contain at least about 50 vol % and more preferably at least about 75 vol % hydrogen.

Hydrogen can be supplied at a rate of from ~300 SCF/B (standard cubic feet of hydrogen per barrel of feed) (~51 $Nm^3/m^3$) to ~10000 SCF/B (~1700 $Nm^3/m^3$). Preferably, the hydrogen can be provided in a range of from ~1000 SCF/B (170 $Nm^3/m^3$) to ~5000 SCF/B (~850 $Nm^3/m^3$).

Hydrogen can be supplied co-currently with the heavy oil feed and/or HSDP crude component or separately via a separate gas conduit to the hydroprocessing zone. The contact of the heavy hydrocarbon oil and HSDP crude component with the hydroprocessing catalyst and the hydrogen can produce a total product that includes a hydroprocessed oil product, and, in some embodiments, gas.

The temperature in the contacting zone can be at least about 680° F. (~360° C.), e.g., at least about 700° F. (~371° C.), at least about 716° F. (~380° C.), at least about 750° F. (~399° C.), or at least about 788° F. (~420° C.). Additionally or alternately, the temperature in the contacting zone can be about 950° F. (~510° C.) or less, e.g., about 900° F. (~482° C.) or less, about 869° F. (~465° C.) or less, or about 842° F. (~450° C.) or less.

Total pressure in the contacting zone can range from 200 psig (1.4 MPag) to 3000 psig (21 MPag), e.g., from 400 psig (2.8 MPag) to 2000 psig (14 MPag), from 650 psig (4.5 MPag) to 1500 psig (10.4 MPag), or from 650 psig (4.5 MPag) to 1200 psig (8.3 MPag). Preferably, a heavy oil can be hydroprocessed under low hydrogen partial pressure conditions. In such aspects, the hydrogen partial pressure during hydroprocessing can be from about 200 psig (~1.4 MPag) to about 1500 psig (~10.4 MPag), e.g., from 400 psig (~2.8 MPag) to about 1000 psig (~6.9 MPag), or from about 500 psig (~3.5 MPag) to about 800 psig (~5.6 MPag). Additionally or alternately, the hydrogen partial pressure can be at least about 200 psig (~1.4 MPag), e.g., at least about 400 psig (~2.8 MPag) or at least about 600 psig (~4.2 MPag). Additionally or alternately, the hydrogen partial pressure can be about 1000 psig (~6.9 MPag) or less, e.g., about 900 psig (~6.3 MPag) or less, about 850 psig (~6.0 MPag) or less, about 800 psig (~5.6 MPag) or less, or about 750 psig (~5.3 MPag) or less. In such aspects with low hydrogen partial pressure, the total pressure in the reactor can be about 1200 psig (~8.3 MPag) or less, e.g., about 1000 psig (~6.9 MPag) or less, about 900 psig (~6.3 MPag) or less, or about 800 psig (~5.6 MPag) or less.

Liquid hourly space velocity (LHSV) of the combined heavy hydrocarbon oil and HSDP crude components can generally range from 0.1 to 30 $hr^{-1}$, e.g., 0.4 $hr^{-1}$ to 20 $hr^{-1}$ or 0.5 $hr^{-1}$ to 10 $hr^{-1}$. In some aspects, LHSV can be at least 5 $hr^{-1}$, e.g., at least 10 $hr^{-1}$ or at least 15 $hr^{-1}$. Alternatively, in some aspects, LHSV can be about 2.0 $hr^{-1}$ or less, e.g., about 1.5 $hr^{-1}$ or less or about 1.0 $hr^{-1}$ or less.

Based on the reaction conditions described above, in various aspects, a portion of the reactions taking place in the hydroprocessing reaction environment can correspond to thermal cracking reactions. In addition to the reactions expected during hydroprocessing of a feed in the presence of hydrogen and a hydroprocessing catalyst, thermal cracking reactions can also occur at temperatures of 360° C. and greater. In the hydroprocessing reaction environment, the presence of hydrogen and catalyst can reduce the likelihood of coke formation based on radicals formed during thermal cracking.

In some embodiments, contacting the input feed in the hydroconversion reactor with the hydroprocessing catalyst in the presence of hydrogen to produce a hydroprocessed product can be carried out in a single contacting zone. Alternatively, contacting can be carried out in two or more contacting zones.

The combination of processing conditions can be selected to achieve a desired level of conversion of a feedstock. For various types of heavy oil feedstocks, conversion relative to a conversion temperature of ~1050° F. (~566° C.) can be a convenient way to characterize the amount of feedstock conversion. For example, the process conditions can be selected to achieve at least about 25% conversion of the ~1050° F.+ portion of a feedstock. In other words, the conditions can be selected so that at least about 25 wt % of the portion of the feed that boils above ~1050° F. (~566° C.) can be converted to a portion that boils below ~1050° F. (~566° C.). In some embodiments, the amount of conversion relative to ~1050° F. (~566° C.) can be at least about 40%, e.g., at least about 50% or at least about 60%. Additionally or alternately the conversion percentage can be about 80% or less, e.g., about 75% or less or about 70% or less. In particular, a suitable amount of conversion can be from about 40% to about 80% or from about 50% to about 70%.

In some optional embodiments, a greater amount of conversion may be desirable. For example, in order to segregate molecules with relatively low hydrogen to carbon ratios using hydroprocessing, a conversion percentage of at least about 80% can be desirable, e.g., at least about 85%, or at least about 90%. Additionally, the conversion percentage can optionally be about 95% or less, such as about 90% or less. In particular, in such optional embodiments, the conversion percentage can be from about 80% to about 95%, e.g., from about 85% to about 95% or from about 80% to about 90%. These levels of conversion can also be useful, for example, for concentrating wax in the ~650° F.+(~343° C.+) or ~700° F.+(~371° C.+) portion of a feedstock, or for forming a low sulfur fuel oil (LSFO). Optionally, a feedstock with a sulfur content of about 3.0 wt % or less can be used when these higher levels of conversion are desired.

Hydroprocessed Product

Relative to the heavy oil feed component in the feedstream, the hydroprocessed product from slurry hydroconversion and/or co-processing with an HSDP crude component can be a material or crude product exhibiting reductions in such properties as average molecular weight, boiling point range, density, and/or concentration of sulfur, nitrogen, oxygen, and/or metals. The total hydroprocessed product can be separated to form one or more particularly desired liquid products and one or more gas products. Optionally, the liquid product can be blended with a hydrocarbon feedstock that is the same as or different from the heavy oil feed component. For example, the liquid hydroprocessed product can be combined with a hydrocarbon oil having a different viscosity, resulting in a blended product having a viscosity between the viscosity of the liquid hydroprocessed product and the viscosity of the heavy oil feed component.

In some embodiments, the hydroprocessed product and/or the blended product can be transported to a refinery and distilled to produce one or more distillate fractions. The distillate fractions can be catalytically processed to produce commercial products such as transportation fuel, lubricants, or chemicals. A bottoms fraction can also be produced, such as bottoms fraction with an ASTM D2887 10% distillation point of at least about 600° F. (~316° C.), or an ASTM D2887 10% distillation point of at least about 650° F. (~343° C.), or a bottoms fraction with a still higher 10% distillation point, such as at least about 750° F. (~399° C.) or at least about 800° F. (~427° C.).

In some embodiments of the invention, the hydroprocessed product can have a total Ni/V/Fe content of at most 50%, e.g., at most 10%, or at most 5%, or at most 3%, or at most 1% of the total Ni/V/Fe content (by wt %) of the heavy oil feed component. In certain embodiments, the fraction of the hydroprocessed product that has an ASTM D2887 10% distillation point of at least about 650° F. (~343° C.) and higher (i.e., ~650° F.+ product fraction) can have, per gram of ~650° F.+(~343° C.+) product fraction, a total Ni/V/Fe content in a range of from $1 \times 10^{-7}$ grams to $2 \times 10^{-4}$ grams (0.1 to 200 ppm), e.g., $3 \times 10^{-7}$ grams to $1 \times 10^{-4}$ grams (0.3 to 100 ppm) or $1 \times 10^{-6}$ grams to $1 \times 10^{-4}$ grams (1 to 100 ppm). In certain embodiments, the ~650° F.+(~343° C.+) product fraction can have not greater than $4 \times 10^{-5}$ grams of Ni/V/Fe (40 ppm).

In certain embodiments of the invention, the hydroprocessed product can have an API gravity of 100-160%, e.g., 110-140%, of that of the heavy oil feed component. In certain embodiments, API gravity of the hydroprocessed product can be from 10°-40°, e.g., from 12°-35° or from 14°-30°.

In certain embodiments of the invention, the hydroprocessed product can have a viscosity of at most 90%, e.g., at most 80% or at most 70%, of that of the heavy oil feed component. In some embodiments, the viscosity of the hydroprocessed product can be at most 90% of the viscosity of the heavy oil feed component, while the API gravity of the hydroprocessed product can be from 100-160%, e.g., from 105-155% or from 110-150%, of that of the heavy oil feed component.

In an alternative embodiment, the ~650° F.+(~343° C.+) product fraction can have a viscosity at ~100° C. of 10 to 150 cSt, e.g., 15 to 120 cSt or 20 to 100 cSt. Most atmospheric resids of crude oils range from 40 to 200 cSt. In certain embodiments, a ~650° F.+(~343° C.+) product fraction can have a viscosity of at most 90%, e.g., at most 50% or at most 5%, of that of the heavy oil feed component.

In some embodiments of the invention, the hydroprocessed product can have a total heteroatom (e.g., S/N/O) content of at most 50%, e.g., at most 10% or at most 5%, of the total heteroatom content of the heavy oil feed component.

In some embodiments of the invention, the sulfur content of the hydroprocessed product can be at most 50%, or at most 10%, or at most 5% of the sulfur content (by wt %) of the heavy oil feed component. The total nitrogen content of the hydroprocessed product can be at most 50%, or at most 10%, or at most 5% of the total nitrogen (by wt %) of the heavy oil feed component, and the hydroprocessed product can have a total oxygen content of at most 75%, e.g., at most 50%, at most 30%, at most 10%, or at most 5% of the total oxygen content (by wt %) of the heavy oil feed component.

Demetallization (Including Hydrodemetallation)

In certain embodiments, prior to the hydroprocessing step described above, the feed can undergo an optional demetallization step, such as hydrodemetallation. Performing a separate hydrodemetallation step prior to hydroprocessing may extend the cycle length of the hydroprocessing unit operating with feed having a high metal content, such as the heavy oil feed and/or the HDSP crude component described above. In the same or alternative embodiments, this optional hydrodemetallation step can improve hydrodesulfurization activity, hydrodenitrogenation activity, hydrodearomatization activity, and/or hydrocracking activity.

In such embodiments, the heavy oil feed can be blended with the HSDP crude component before or after this hydrodemetallation process. In certain embodiments, the feed being subjected to the hydrodemetallation process can include any or all of the properties discussed above with respect to the heavy oil feed. In certain embodiments, the hydrodemetallation feed can include a vacuum resid portion of the heavy oil feed.

In some embodiments, a hydrodemetallation catalyst can include a regenerated hydroprocessing catalyst, such as a regenerated version of a hydroprocessing catalyst discussed above, extruded together with a high pore volume support material, such as alumina, silica aluminia, or silica-type materials. This combined catalytic material can include NiMo, CoMo, or NiW material from the regenerated hydroprocessing catalysts for activity in combination with an inert material that can provide the surface area and porosity to trap the feed metals. The hydroprocessing catalysts can be regenerated using any conventional regeneration processes used in refineries, such as exposing the spent catalysts to heat.

In certain embodiments, the high pore volume support materials and/or the resulting catalyst from combining the high pore volume support material with a regenerated catalyst can have a pore volume of at least about 0.4 cm$^3$/g, e.g., at least about 0.5 cm$^3$/g or at least about 0.6 cm$^3$/g, and/or less than about 1.5 cm$^3$/g, e.g., less than about 1.2 cm$^3$/g or less than about 1.0 cm$^3$/g. In particular, the high pore volume support materials and/or the resulting catalyst from combining the high pore volume support material with a regenerated catalyst can have a pore volume of about 0.4 cm$^3$/g to about 1.5 cm$^3$/g, about 0.5 cm$^3$/g to about 1.2 cm$^3$/g, or about 0.6 cm$^3$/g to about 1.0 cm$^3$/g.

In certain embodiments, the high pore volume support materials and/or the resulting catalyst from combining the high pore volume support material with a regenerated catalyst can have a mean pore diameter of at least about 50 Å, e.g., at least about 100 Å or at least about 125 Å; and/or less than about 400 Å, e.g., less than about 300 Å or less than about 200 Å. In particular, the high pore volume support materials and/or the resulting catalyst from combining the high pore volume support material with a regenerated catalyst can have a mean pore diameter of about 50 Å to about 400 Å, about 100 Å to about 300 Å, or about 125 Å to about 200 Å.

In various embodiments, the high pore volume support materials and/or the resulting catalyst from combining the high pore volume support material with a regenerated catalyst can have a total surface area of at least about 50 m$^2$/g, e.g., at least about 60 m$^2$/g or at least about 75 m$^2$/g, and/or less than about 250 m$^2$/g, e.g., less than about 200 m$^2$/g or less than about 150 m$^2$/g. In particular, the high pore volume support materials and/or the resulting catalyst from combining the high pore volume support material with a regenerated catalyst can have a total surface area of about 50 m$^2$/g to about 250 m²/g, about 60 m²/g to about 200 m²/g, or about 75 m²/g to about 150 m²/g.

In one or more embodiments, the high pore volume support materials and/or the resulting catalyst from combining the high pore volume support material with a regenerated catalyst can have an external surface area of at least about 50 m²/g, e.g., at least about 60 m²/g or at least about 75 m²/g, and/or less than about 250 m²/g, e.g., less than about 200 m²/g or less than about 150 m²/g. In particular, the high pore volume support materials and/or the resulting catalyst from combining the high pore volume support material with a regenerated catalyst can have an external surface area of about 50 m²/g to about 250 m²/g, about 60 m²/g to about 200 m²/g, or about 75 m²/g to about 150 m²/g.

In certain embodiments, the amount of regenerated catalyst present in the hydrodemetallation catalyst can be at least about 1 wt %, e.g., at least about 5 wt % or at least about 10 wt %, and/or less than about 80 wt %, e.g., less than about 75 wt % or less than about 65 wt %. In particular, the amount of regenerated catalyst present in the hydrodemetallation catalyst can be about 1 wt % to about 80 wt %, about 5 wt % to about 75 wt %, or about 10 wt % to about 65 wt %, with the remainder comprising the high pore volume support materials.

As mentioned above, the regenerated hydroprocessing catalyst material and the high pore volume support materials can be co-extruded to form the hydrodemetallation catalyst. In such embodiments, the hydrodemetallation catalyst can be extruded in any shape and size, and a particular shape and size can be chosen by one skilled in the art for a specific purpose.

The hydrodemetallation process can generally include milder conditions than the hydroprocessing described above. In certain embodiments, the hydrodemetallation reactor can be operated at a pressure of at least about 100 psig (~0.7 MPag), e.g., at least about 150 psig (~1.0 MPa) or at least about 200 psig (~1.4 MPag), and/or less than about 900 psig (~6.3 MPag), e.g., less than about 800 psig (~5.6 MPag) or less than about 700 psig (~4.9 MPag). In particular, the hydrodemetallation reactor can be operated at a pressure of about 100 psig (~0.7 MPag) to about 900 psig (~6.3 MPag), about 150 psig (~1.0 MPa) to about 800 psig (~5.5 MPag), or about 200 psig (~1.4 MPag) to about 700 psig (~4.9 MPag).

In various embodiments, the hydrodemetallation reactor can be operated at a temperature of at least about 400° F. (~204° C.), e.g., at least about 450° F. (~232° C.) or at least about 500° F. (~260° C.), and/or less than about 1100° F. (~593° C.), e.g., less than about 1000° F. (~538° F.) or less than about 900° F. (~482° C.). In particular, the hydrodemetallation reactor can be operated at a temperature of about 400° F. (~204° C.) to about 1100° F. (~593° C.), about 450° F. (~232° C.) to about 1000° F. (~538° F.), or about 500° F. (~260° C.) to about 900° F. (~482° C.).

In certain embodiments, the LHSV can depend upon the type of reactor configuration used for the hydrodemetallation process. Generally, the LHSV for the heavy oil feed or for the blended heavy oil feed and the HSDP crude component can be at least about 0.05 hr$^{-1}$, e.g., at least about 0.1 hr$^{-1}$ or at least about 0.2 hr$^{-1}$, and/or less than about 15 hr$^{-1}$, e.g., less than about 12 hr$^{-1}$ or less than about 10 hr$^{-1}$. In particular, the LHSV for the heavy oil feed or for the blended heavy oil feed and the HSDP crude component can be about 0.05 hr$^{-1}$ to about 15 hr$^{-1}$, about 0.1 hr$^{-1}$ to about 12 hr$^{-1}$, or about 0.2 hr$^{-1}$ to about 10 hr$^{-1}$.

In operation, at least some of the pores of the hydrodemetallation catalyst can trap at least a portion of the metals, such as including Ni, V, and/or Cr, present in the feed. In such operation, over time, the catalysts can become filled with metals and may be discarded (or regenerated for reuse) once the demetallization activity is substantially reduced.

Any conventional type of fixed or ebullated bed reactor system or configuration can be utilized for the hydrodemetallation process. In certain embodiments, the hydrodemetallation process can be operated as a cyclic process where a plurality of reactors are used, so that one reactor can operate while spent catalyst from another reactor can be removed and repacked with fresh hydrodemetallation catalyst. In alternative embodiments, an ebullating bed configuration can be utilized to allow removal of spent catalyst and addition of fresh hydrodemetallization catalyst. Still another alternative option can be to perform hydrodemetallation under slurry processing conditions for demetallization described above.

Additional Embodiments

Embodiment 1. A process for producing a hydroprocessed product, comprising: exposing a feedstock to a catalyst under effective slurry hydroconversion conditions to form a slurry hydroprocessing effluent, the effective slurry hydroconversion conditions being effective for conversion of at least about 90 wt % of the feedstock relative to a conversion temperature, the catalyst comprising catalyst particles having a particle size of at least about 2 μm (optionally 500 μm or less, optionally 20 μm to 100 μm); and separating at least about 95 wt % (or at least about 98 wt %) of the catalyst particles having a particle size of at least about 2 μm from the slurry hydroprocessing effluent using a catalyst recovery system comprising one or more drum separators and a cross-flow filter, the one or more drum separators optionally comprising cyclone separators.

Embodiment 2. The process of Embodiment 1, wherein a) the feedstock has a T95 distillation point of about 600° C. or less, b) the feedstock has a 10% distillation point of at least about 900° F. (~482° C.), a Conradson carbon residue of at least about 27.5 wt % (or at least about 30 wt %), or a combination thereof, or c) a combination of a) and b).

Embodiment 3. The process of any of the above embodiments, further comprising exposing the feedstock to a demetallization catalyst under slurry hydroprocessing demetallization conditions prior to exposing the combined feedstock to the catalyst under slurry hydroconversion conditions.

Embodiment 4. The process of Embodiment 3, wherein a) the demetallization catalyst has a mean pore diameter of 60 Å or less, b) the demetallization catalyst comprises a catalyst with a surface area of at least about 1000 m²/g and a micro pore volume of at least 0.1 cm³/g, the catalyst optionally having a support is substantially free of alumina, or c) a combination of a) and b).

Embodiment 5. The process of Embodiment 3, wherein the demetallization catalyst comprises at least about 1.0 wt % of a Group 6 metal, at least about 0.5 wt % of a Group 8-10 metal, and at least about 1.0 wt % of phosphorus on a support, the catalyst having a mean pore diameter of about 150 Å or less, the catalyst having at least one of a micro pore volume of less than about 0.05 cm³/g and a ratio of external surface area to total surface area of at least about 0.80 (or at least about 0.85 or at least about 0.90).

Embodiment 6. The process of Embodiment 3, wherein the demetallization catalyst comprises at least about 1.0 wt % of a Group 6 metal and at least about 0.5 wt % of a Group 8-10 metal, the catalyst having a mean pore diameter of about 200 Å or less (or about 150 Å or less, or about 120 Å or less), a total surface area of 140 m²/g or less, and at least one of a micro pore volume of less than about 0.05 cm³/g and a ratio of external surface area to total surface area of at least about 0.80 (or at least about 0.85 or at least about 0.90).

Embodiment 7. A catalyst composition comprising at least about 1.0 wt % of a Group 6 metal, at least about 0.5 wt % of a Group 8-10 metal, and at least about 1.0 wt % of phosphorus on a support, the catalyst having a mean pore diameter of about 150 Å or less (or about 120 Å or less) and at least one of a micro pore volume of less than about 0.05 cm³/g and a ratio of external surface area to total surface area of at least about 0.80 (or at least about 0.85 or at least about 0.90), wherein the support optionally comprises alumina, γ-alumina, θ-alumina, or a combination thereof.

Embodiment 8. A catalyst composition comprising at least about 1.0 wt % of a Group 6 metal and at least about 0.5 wt % of a Group 8-10 metal on a support, the catalyst having surface area of at least about 1000 m²/g, a mean pore diameter of 60 Å or less, and a micro pore volume of at least 0.1 cm³/g, the support optionally being substantially free of alumina.

Embodiment 9. A system for producing a hydroprocessed product, comprising: a slurry hydroprocessing reactor having a feed inlet and a reactor outlet; a product recovery separation stage; and a catalyst recovery system comprising: one or more drum separators having a lower density outlet and a higher density outlet, at least one drum separator having a drum separator inlet in fluid communication with the reactor outlet; and a cross-flow filter, at least one drum separator having a lower density outlet in indirect fluid communication with the product recovery separation stage via the cross-flow filter, the catalyst recovery system being configured for separation of at least about 95 wt % (or at least about 98 wt %) of the catalyst particles having a particle size of at least about 2 μm from a slurry hydroprocessing effluent, the one or more drum separators optionally comprising cyclone separators.

Embodiment 10. The system of Embodiment 9, wherein the at least one drum separator having a drum separator inlet in fluid communication with the reactor outlet is the same as the at least one drum separator having a lower density outlet in indirect fluid communication with the product recovery separation stage.

Embodiment 11. The system of Embodiment 9 or Embodiment 10, further comprising a second slurry hydroprocessing reactor having a second feed inlet and a second reactor outlet, the second reactor outlet being in fluid communication with the feed inlet, the second slurry hydroprocessing reactor further comprising a slurry demetallization catalyst.

Embodiment 12. A process for producing a hydroprocessed product, comprising: exposing a combined feedstock comprising a heavy oil feed component and at least about 5 wt % of a High Solvency Dispersive Power (HSDP) crude component to a hydroprocessing catalyst under effective fixed bed hydroprocessing conditions to form a hydroprocessed effluent, the effective fixed bed hydroprocessing conditions including a pressure of about 1500 psig (~10.4 MPa) or less (or about 1000 psig (~6.9 MPag) or less, or about 800 psig (~5.6 MPag) or less), a temperature of at least about 360° C., and a liquid hourly space velocity of the fraction of the combined feedstock boiling above ~1050° F. (~566° C.) of at least about 0.10 hr⁻¹, the HSDP crude component having a TAN of at least about 0.3 and a solubility blending number of at least about 75, the HSDP crude component optionally comprising an aromatics content of at least about 50 wt %.

Embodiment 13. The process of Embodiment 12, wherein a) the HSDP crude component has a 10% distillation point of at least about 800° F. (~427° C.), such as at least about 900° F. (~482° C.); b) the heavy oil feed component has a 10% distillation point of at least about 650° F. (~343° C.), such as at least about 900° F. (~482° C.); or c) a combination of a) and b).

Embodiment 14. The process of Embodiment 12 or Embodiment 13, wherein the effective fixed bed hydroprocessing conditions are effective for conversion of from about 50 wt % to about 70 wt % of the ~1050° F.+(~566° C.+) portion of the heavy oil feed component.

Embodiment 15. The process of any of Embodiments 12 to 14, further comprising exposing the combined feedstock to a demetallization catalyst under hydrodemetallation conditions prior to exposing the combined feedstock to the hydroprocessing catalyst, the demetallization catalyst comprises about 5 wt % to about 60 wt % of a regenerated catalyst extruded with a support, the demetallization catalyst having a pore volume of at least about 0.5 cm³/g, the regenerated catalyst comprising 1.0 wt % to 30 wt % (relative to the weight of regenerated catalyst) of a Group 6 metal, a Group 8-10 metal, or a combination thereof.

EXAMPLES

Example 1—Reduced Fouling Tendencies of an HSDP Crude

The effectiveness of an HSDP crude component for performing solvent assisted hydroprocessing was investigated using an HSDP crude and/or its ~800° F.+(~427° C.) fraction as the HSDP crude component. In an initial test, a commercially available tool from Alcor Petrolab was used to investigate fouling behavior of a heavy oil versus the heavy oil with addition of an HSDP crude component.

Briefly, a test rig was used to measure the effect of adding an HSDP crude component for a crude oil sample containing added solid particulates. The test rig included a reservoir containing a feed supply of the oil under test. The feed supply was heated to a temperature of approximately 150° C. (~302° F.) and then fed into a shell containing a vertically oriented heated rod. The heated rod was electrically heated to a predetermined temperature and maintained at the predetermined temperature during the trial. Typically rod surface temperatures are approximately 370° C. (~698° F.) and approximately 400° C. (~752° F.). The feed supply was pumped across the heated rod at a flow rate of approximately 3.0 ml/minute. The spent feed supply was collected in the top section of a reservoir, in which it was separated from the untreated feed supply oil by a sealed piston, to allow for once-through operation. The system was pressurized with nitrogen (~400-500 psig) to ensure gases remain dissolved in the oil during the test. Thermocouple readings were recorded for the bulk fluid inlet and outlet temperatures and for surface of the rod. This apparatus was designed to allow for constant surface temperature testing of the amount of foulant depositing on surfaces.

During the constant surface temperature testing, foulant deposited and built up on the heated surface and became thermally degraded to coke. The coke deposits caused an insulating effect believed to reduce the efficiency and/or ability of the surface to heat the oil passing over it. The resulting reduction in outlet bulk fluid temperature can continue over time as fouling continues. This reduction in temperature is referred to as the outlet liquid ΔT (or dT) and can be dependent on the type of crude oil/blend, testing conditions, and/or other effects, such as the presence of salts, sediment, and/or other fouling promoting materials. The fouling test was carried out for about 180 minutes. The total fouling, as measured by the total reduction in outlet liquid temperature, is referred to as $\Delta T_{180}$ or $dT_{180}$.

Figure 6:
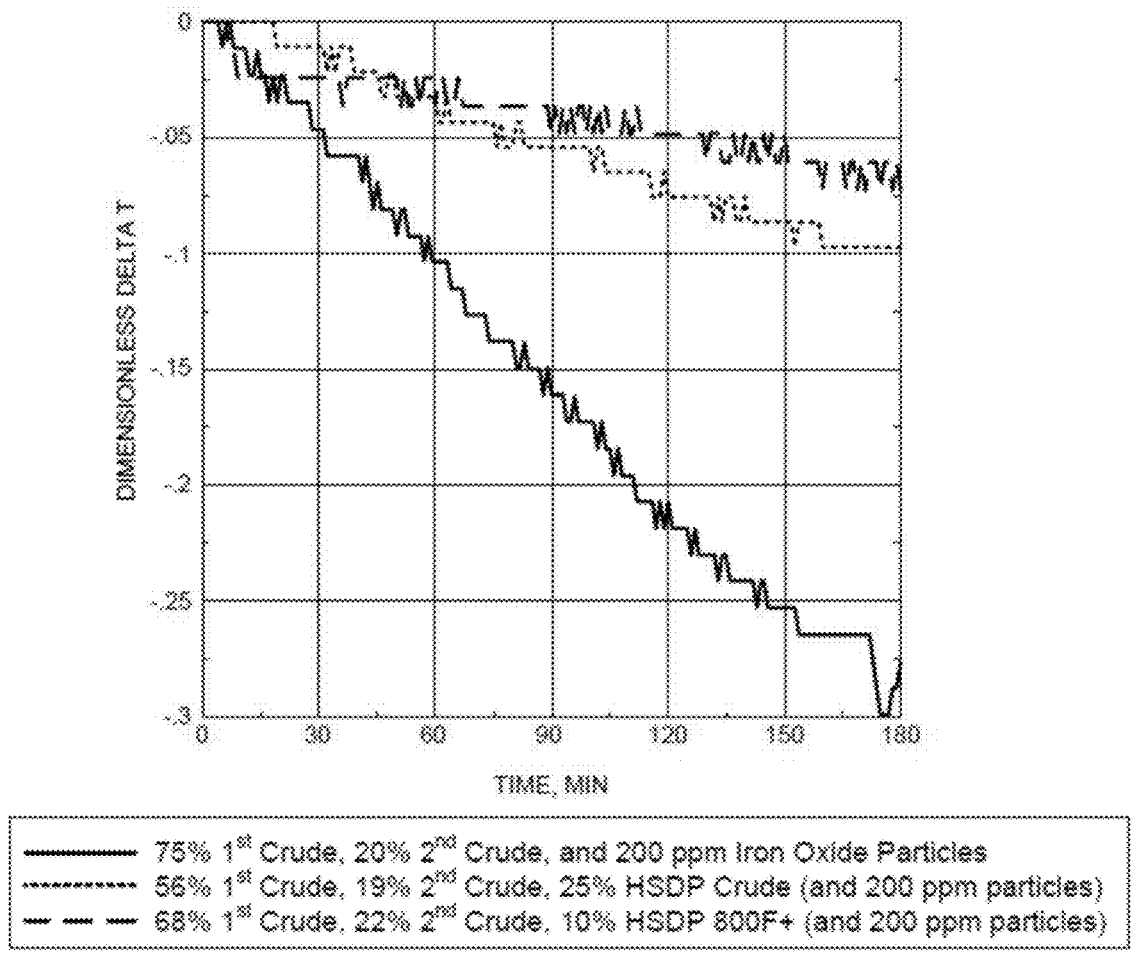
FIG. 6 shows data related to fouling tendencies of various feedstocks.

FIG. 6 shows testing results of an HSDP crude and its ~800° F.+(~427° C.+) fraction. The fouling blend consisted of ~75 wt % of a first conventional crude, ~25 wt % of a second conventional crude, and ~200 wppm iron oxide particulates. This fouling blend was depicted in FIG. 6 as the reference fouling blend. The drop in $\Delta T$ over the 180 minute test shows the fouling nature of this reference blend, as evidenced by reduced heat transfer, which resulted in a more negative $\Delta T$. When ~25 wt % of HSDP crude was added to the fouling blend (resulting in ~56 wt % first crude, ~19 wt % second crude, ~25 wt % HSDP crude, and the iron oxide particles), the amount of fouling was significantly decreased, as evidenced by the less negative delta T. Additionally, when ~10% of an ~800° F.+(~427° C.+) portion of the HSDP crude, which can be referred to as a HSDP resid portion, was added to the reference blend (resulting in ~68 wt % first crude, ~22 wt % second crude, ~10 wt % HSDP ~800° F.+(~427° C.+) bottoms, and iron oxide particles) it was evident that this ~800° F.+(~427° C.+) portion was effective at reducing fouling at even lower treat levels. This shows that a blend of an HSDP crude or crude component (such as a resid fraction) with a heavy oil feed can reduce fouling tendencies compared to the heavy oil feed alone.

Example 2—Hydroprocessing of a Heavy Oil with an HSDP Crude Component

It has been unexpectedly discovered that blending an HSDP crude component, e.g., HSDP ~800° F.+(~427° C.+) bottoms to a heavy oil resid feed, can extend the run length of a fixed catalyst bed reactor approximately three-fold.

The (upflow) reactor was a ½ inch ID (inside diameter) stainless tube reactor body heated by a three-zone furnace. ~25 cc of a commercially available supported CoMo hydrotreating catalyst, sized to ~40-60 mesh, was loaded to the mid-zone of the reactor. The top and bottom zones of the reactor were loaded with ~80-100 mesh SiC to support the catalyst.

After loading the reactor, the unit was pressure tested at ~1000 psig with $N_2$ followed by $H_2$. The catalyst was sulfided with ~200 cc of a sulfiding solution containing ~80 wt % of a 130N lube base stock and ~20 wt % ethyldisulfide. The reactor temperature was increased from room temperature (~20-25° C.) to ~110° C. (230° F.) at about 1° C./min, and then held at ~110° C. (~230° F.) for ~1 hr (this step took about 2.5 hours). Next the reactor temperature was increased from ~110° C. (230° F.) to ~250° C. (~482° F.) at ~1° C./min, and then held at ~250° C. for ~12 hr. It is believed that most of the sulfiding occurred at ~250° C. (~482° F.). Next, the reactor temperature was increased from ~250° C. (~482° F.) to ~340° C. (~644° F.) at ~1° C./min, and then held at ~340° C. (~644° F.). The final holding temperature of the reactor was at ~340° C. (644° F.).

After this sulfiding step, the desired feed (described in Table 1 below) was introduced at ~0.17 LHSV with an $H_2$ flow of ~3000 SCF/B (~540 $Sm^3/m^3$). The reactor temperature was then ramped up at ~1° C./min to ~385° C. (~725° F.) while the reactor pressure stayed at ~750 psig (~5.2 MPa).

TABLE 1

Feed Description

| Components | Conventional Atmospheric Resid | HSDP ~800° F.+ BTMS | ~90 wt % ATM Resid/ ~10 wt % HSDP ~800° F.+ BTMS |
|---|---|---|---|
| $C_5$-400° F. (wt %) | 0 | 0 | 0 |
| ~400-650° F. (wt %) | ~3 | 0 | ~3 |
| ~650-1050° F. (wt %) | ~55 | ~39 | ~55 |
| ~1050° F.+ (wt %) | ~42 | ~61 | ~42 |
| API Gravity | ~12.3 | ~14.5 | N/A |
| S, wt % | ~4.6 | ~0.25 | ~4.2 |
| N, wt % | ~0.26 | ~0.65 | ~0.29 |
| Ni, wppm | ~22 | ~4 | ~21 |
| V, wppm | ~79 | ~5 | ~77 |

The total liquid products (TLP) were collected twice per week from the units and analyzed. The boiling point profile of the products was determined using a simulated distillation test method. The sulfur content was determined utilizing the ASTM test method D2622. The metal content was determined utilizing an inductively coupled plasma mass spectrometry (ICP-MS) test method. The off-gas was analyzed with an online gas chromatograph (GC) and an off-line GC. The online GC determined hydrocarbon (HC) contents and $H_2$ (no $H_2S$), while the off-line GC determined HC, $H_2$, $H_2S$, and gas density.

Figure 7:
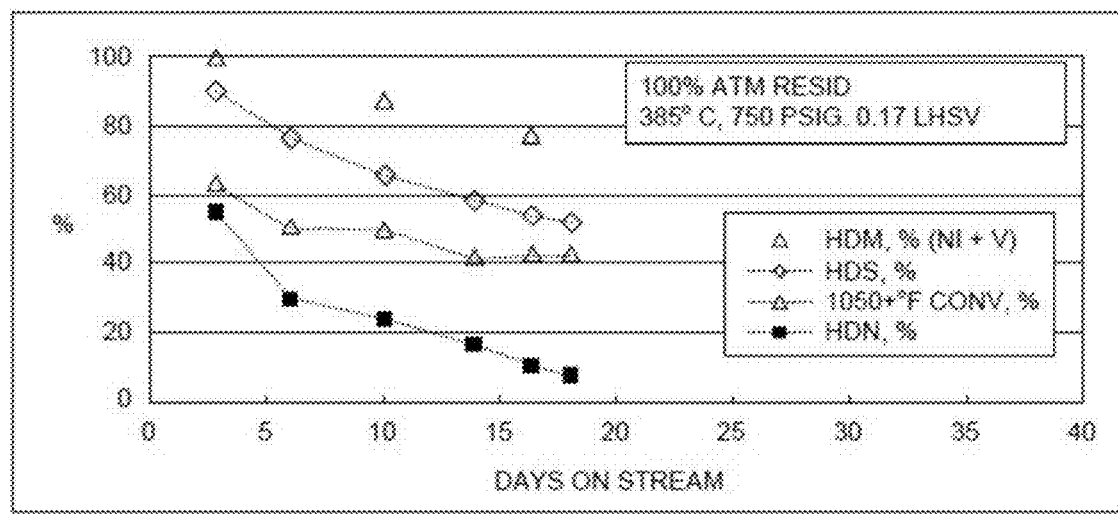
FIG. 7 shows catalyst performance on the hydroprocessing of a heavy oil feed in a fixed bed micro unit.

FIG. 7 shows the performance of the catalyst with the ~100% atmospheric resid (conventional, first column of Table 1) as feed. The catalyst was on stream for ~18 days with decreasing activity as reflected by 1050° F.+(~566° C.+) conversion, hydrodemetallization (HDM), hydrodesulfurization (HDS), and hydrodenitrogenation (HDN). As can be seen in FIG. 7, the HDM, HDS, and HDN activities, and the ~1050° F.+(~566° C.+) conversion consistently decreased as the run progressed without stabilization. After ~18 days, the run was forced to shut down due to pump overpressure. Thus, these results show that the catalyst underwent increasing levels of deactivation as the run continued.

Figure 8:
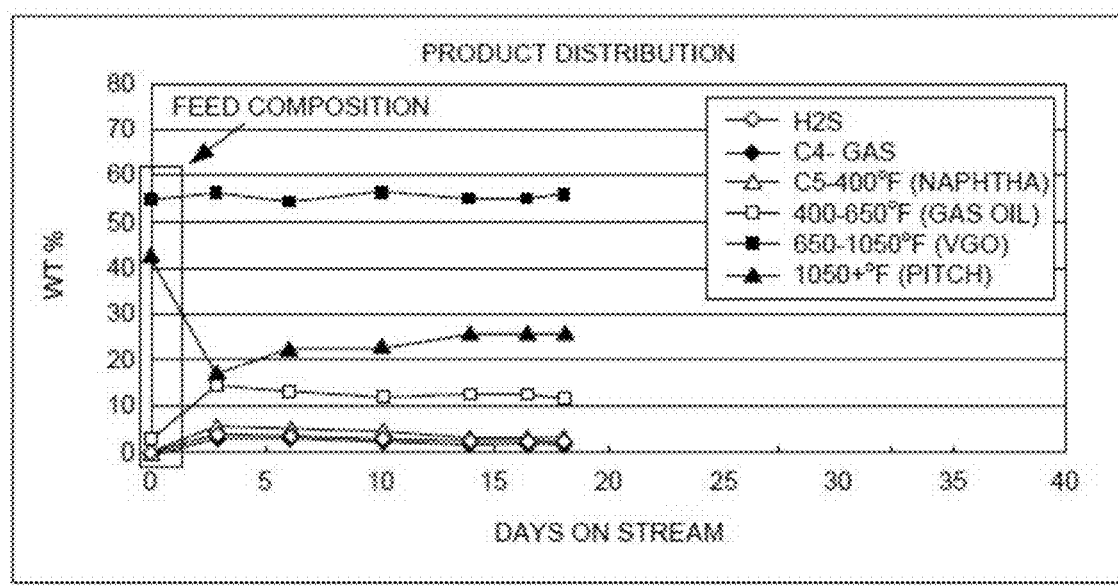
FIG. 8 shows product characterization from the hydroprocessing of the heavy oil feed from FIG. 7.

FIG. 8 shows the product composition at varying times throughout the run of the reactor. During the first few days of the run, about 50% of the ~1050° F.+(~566° C.+) component of the feed was converted. As the run continued, the amount of conversion was reduced until it stabilized at about 30%-35% conversion. The amounts of atmospheric gas oil and naphtha showed a corresponding increase during the first few days of the run before leveling off over time.

Figure 9:
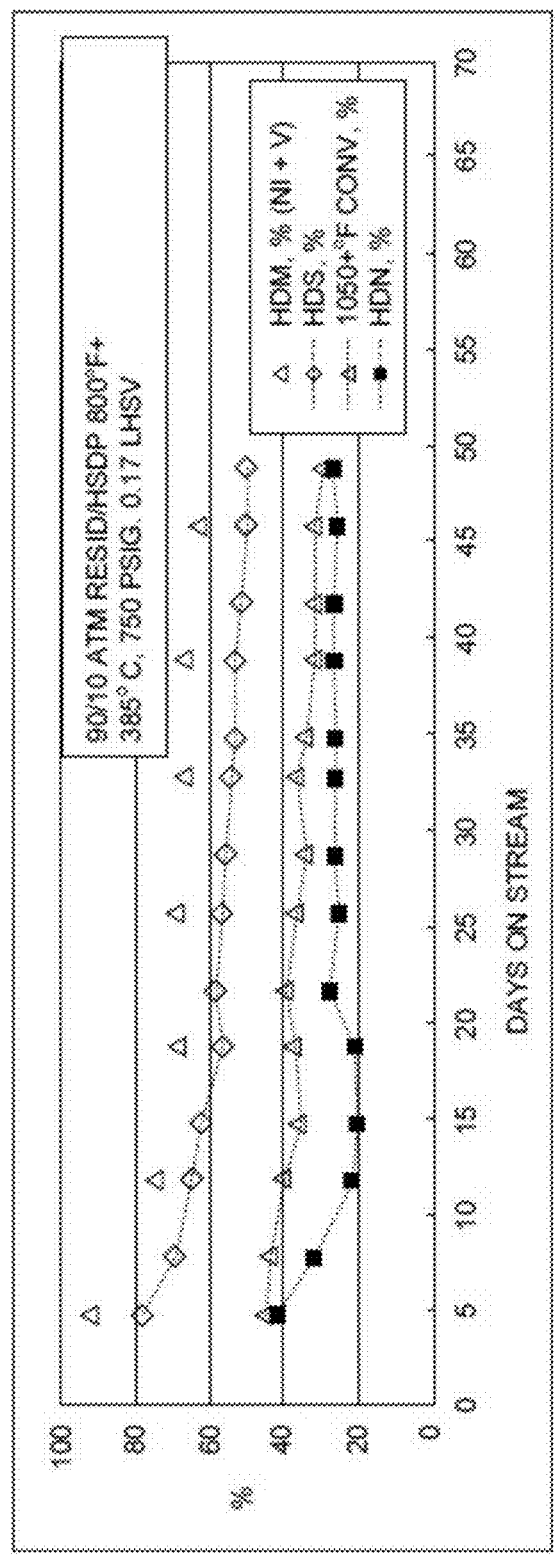
FIG. 9 shows catalyst performance on the hydroprocessing of a heavy oil feed blended with an HSDP component in a fixed bed micro unit.

FIG. 9 shows results from a processing run similar to the run in FIG. 7, with the exception that the feed corresponded to ~90% atmospheric resid/~10% HSDP ~800° F.+(~427° C.+) bottoms feed. The catalyst was on stream for about 50 days. To improve conversion, HDM, HDS, and HDN, the reactor temperature was increased to ~400° C. after about 50 days. The reactor experienced an over pressure afterwards, which resulted in the run being shut down. It is reasonable to expect, however, that, if the temperature were kept at ~385° C., the experiment could have continued. This test showed that the use of ~10% HSDP ~800° F.+(~427° C.+) bottoms was able to extend run length to almost three fold.

The level of HDM, HDS, and HDN in FIG. 9 stayed relative consistent after an initial reduction in activity in the first ~15 days. Thus, unlike the continued deactivation of the catalyst in the reactor with the ~100% atmospheric resid feed (depicted in FIGS. 7 and 8), the catalyst in the reactor with the ~90% atmospheric resid/~10% HSDP ~800° F.+

(~427° C.+) bottoms feed did not continue to deactivate as quickly as the run progressed.

Figure 10:
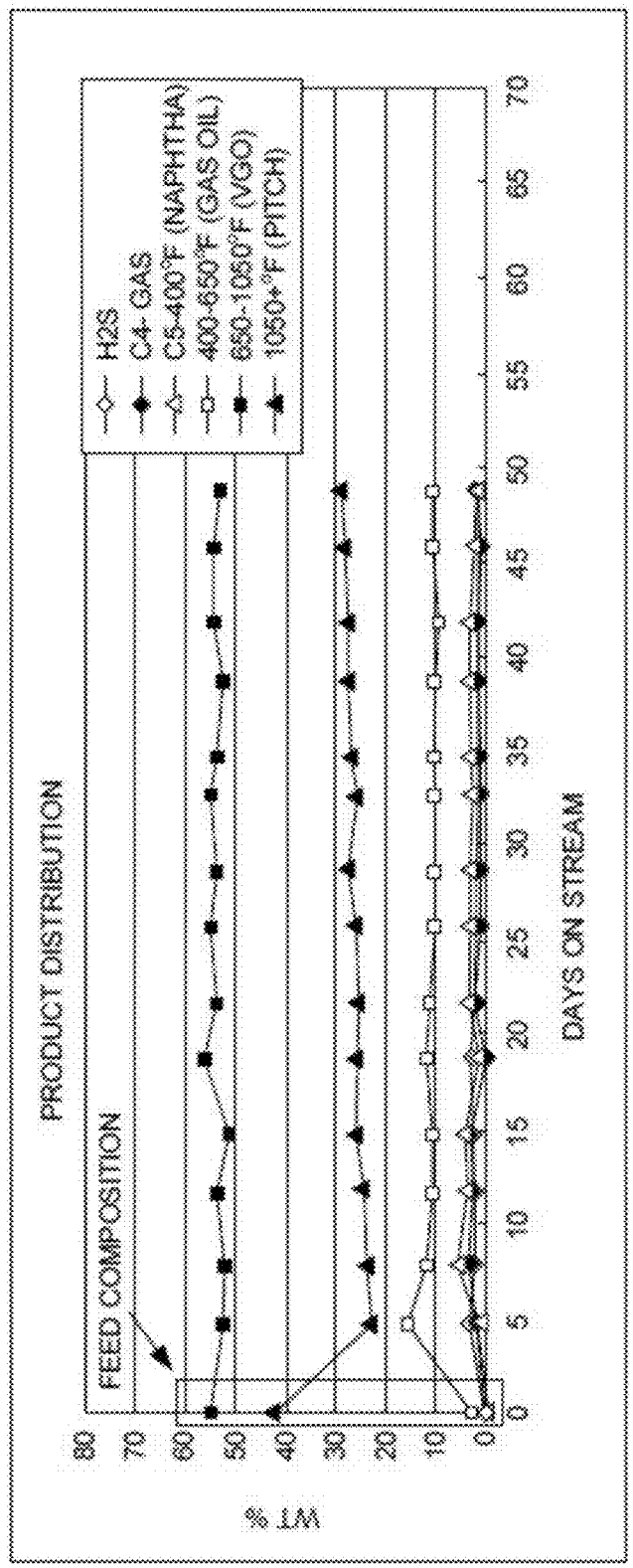
FIG. 10 shows product characterization from the hydroprocessing of the heavy oil feed blended with an HSDP component from FIG. 9.

FIG. 10 shows the product composition for the process run in FIG. 9. Similar to the results in FIG. 8, the first few days of the run showed higher conversion of the ~1050° F.+(~566° C.+) portion of the feed, with the composition of the product becoming roughly stable over time. However, because the catalyst did not continue to deactivate, the roughly stable product composition in FIG. 10 could be generated over a much longer period of time than the products shown in FIG. 8.

Table 2 below compares the catalyst performance of the two runs at the end of the experiment, ~18 days for the ~100% resid and ~49 days for the mixed feed. Although ~1050° F.+(~566° C.+) conversion with the feed including the HSDP crude component was lower than the ~100% resid feed at the end of the run, the activity for HDM and HDS were comparable. Additionally, the hydrodenitrogenation activity was unexpectedly higher at the end of the run for the feed including the HSDP crude component. Coke analysis on spent catalysts showed that the run with mixed feed had higher coke content in zones 1 and 4. This was consistent, since the end of run temperature was higher (~400° C.) than that with the ~100% resid feed (~385° C.).

TABLE 2

HSDP crude assisted hydroprocessing comparison

|  | ~100% ATM Resid | ~90% ATM Resid/ ~10% HSDP ~800° F.+ BTMS |
|---|---|---|
| Duration of the run | ~18 days | ~49 days (before temp increase to 400° C.) |
| Throughput (total feed processed/ catalyst, g/g) | ~103 | ~279 |
| Performance at the end of run | ~18 days on Stream | ~49 days on Stream |
| ~1050° F.+ Conversion, % | ~42 | ~30 |
| HDM, % | ~75 | ~72 |
| HDS, % | ~52 | ~50 |
| HDN, % | ~7 | ~27 |
| Product Distribution, wt % | | |
| $H_2S$ | ~2.1 | ~1.8 |
| C4-gas | ~1.9 | ~2.2 |
| C5-400° F. (Naphtha) | ~3.3 | ~2.4 |
| ~400-650° F. (Gas Oil) | ~11.4 | ~10.4 |
| ~650-1050° F. (VGO) | ~55.8 | ~53.9 |
| ~1050° F.+ (Pitch) | ~25.5 | ~29.3 |
| Sum | ~100 | ~100 |
| Coke on spent cat, wt % | | |
| (End-of-run temperature) | (~385° C.) | (~400° C.) |
| Zone 4 - outlet, top of reactor | ~21.8 | ~24.8 |
| Zone 3 | ~26.8 | ~26.2 |
| Zone 2 | ~28.1 | ~28.4 |
| Zone 1 - inlet, btm of reactor | ~29.9 | ~32.4 |

Example 3—Preparation of Demetallization Catalysts

Various demetallization catalysts were prepared by depositing CoMo metal oxides on various support particles. As an example, for Catalyst Sample A, the support particles were γ-$Al_2O_3$ 1/16 inch quadlobe extrudates with a surface area of about 200 m²/g, a pore volume of about 0.72 cm³/g, and a pore size of about 96 Å. The characterization of the support particles was performed using BET $N_2$ desorption. As an example of sample preparation, ~1.54 g of ammonium heptamolybdate tetrahydrate (containing ~81.4 w % $MoO_3$) and ~1.62 g of cobalt nitrate (containing ~20.2 wt % Co) were dissolved in ~20 g of distilled water. The total solution volume was ~32.8 mL. About 40 grams of the extrudate particles were impregnated with the solution by incipient wetness. The sample was dried in air at ~250° F. for ~16 hours and then calcined in air at ~1000° F. for ~6 hours. The furnace was ramped at a rate of about 5° F./min. The metal contents of the resulting catalysts were ~1 wt % Co as CoO, and about 3 wt % Mo as $MoO_3$.

Using a procedure similar to the above, a series of catalyst samples containing roughly the same Co and Mo loadings were prepared corresponding to Catalyst Samples B-F.

Catalyst B: θ-$Al_2O_3$ 1/10 inch trilobe extrudates with ~1 wt % Co as CoO and ~3 wt % Mo as $MoO_3$. Catalyst B had a surface area of about 126 m²/g, a pore volume of about 0.58 cm³/g, and a pore size of about 143 Å.

Catalyst C: α-$Al_2O_3$ 3/16 inch spheres with ~1 wt % Co as CoO and ~3 wt % Mo as $MoO_3$. Catalyst C had a surface area of about 0.8 m²/g, a pore volume of about 0.46 cm³/g, and a pore size of about 2.8 μm.

Catalyst D: α- and θ-$Al_2O_3$ phase mixture 1/8 inch cylinder extrudates with ~1 wt % Co as CoO and ~3 wt % Mo as $MoO_3$. Catalyst D had a surface area of about 32 m²/g, a pore volume of about 0.15 cm³/g, and a pore size of about 155 Å.

Catalyst E: Activated carbon 1/10 inch cylinder extrudates with ~1 wt % Co as CoO and ~3 wt % Mo as $MoO_3$. Catalyst E had a surface area of about 1491 m²/g, a pore volume of about 0.15 cm³/g, and a pore size of about 155 Å.

Catalyst F: Catalyst F corresponded to Catalyst A with an additional doping with $P_2O_5$. About 1.25 g of ammonium dihydrogen phosphate was dissolved in ~10 g of water. The total solution volume was adjusted to result in ~14.2 ml of solution. About 20 grams of Catalyst A extrudates were impregnated with the ammonium dihydrogen phosphate solution by incipient wetness. A drying and calcining procedure similar to Catalyst A was then performed. The phosphorus content of the catalyst was about 3.7 wt % (as $P_2O_5$).

Based on the nature of the resulting catalysts of Catalysts A to F, Catalysts B, E, and F were selected for further investigation. Table 3 shows additional information regarding Catalysts B, E, and F.

TABLE 3

Demetallization Catalysts

|  |  | Catalyst F | Catalyst E | Catalyst B |
|---|---|---|---|---|
| Shape |  | 1/16 inch quadlobe | 1/10 inch cylinder | 1/10 inch trilobe |
| Metals (wt %) | | | | |
| Co |  | ~0.7 | ~0.6 | ~0.8 |
| Ni |  | ~0.07 | <0.01 | <0.01 |
| Mo |  | ~2.1 | ~1.9 | ~2.0 |
| P |  | ~2.3 | — | — |
| Pore Vol. | cm³/g | ~0.71 | ~0.69 | ~0.61 |
| Mean Pore Diam. | Å | ~107 | ~39 | ~192 |
| Surface Area | m²/g | ~199 | ~1480 | ~127 |
| Extern. Surf. Area | m²/g | ~182 | ~217 | ~115 |
| Micropore Vol. | cm³/g | ~0.008 | ~0.52 | ~0.006 |

As shown in Table 3, Catalyst F is a catalyst including a Group 8-10 metal (Co, plus a small amount of Ni), also including phosphorus and having a relatively small mean pore diameter for a demetallization catalyst (~107 Å). Catalyst F also has a reduced/minimized amount of micropore volume, so that almost all of the catalyst surface area corresponds to external surface area, as opposed to surface area within pores of the catalyst.

More generally, Catalyst F is representative of supported demetallization catalysts that include or have at least about 1.0 wt % of a Group 6 metal (such as about 1.0 wt % to about 5.0 wt %, or at least about 2.0 wt % or at least about 3.0 wt %, and in particular about 1.0 wt % to about 5.0 wt %, about 2.0 wt % to about 5.0 wt %, or about 3.0 wt % to about 5.0 wt %); at least about 0.5 wt % of a Group 8-10 metal (such as about 0.5 wt % to about 1.5 wt %, or at least about 0.7 wt %, or at least about 1.0 wt %, and in particular about 0.5 wt % to about 1.5 wt %, about 0.7 wt % to about 1.5 wt %, or about 1.0 wt % to about 1.5 wt %); at least about 1.0 wt % of phosphorus (such as about 1.0 wt % to about 5.0 wt %, or at least about 1.5 wt %, or at least about 2.0 wt %, or at least about 3.0 wt %, and in particular about 1.0 wt % to about 5.0 wt %, about 1.5 wt % to about 5.0 wt %, or about 2.0 wt % to about 5.0 wt %); a mean pore diameter of about 150 Å or less (or about 120 Å or less, such as optionally down to about 60 Å); optionally a micro pore volume of less than about 0.05 cm$^3$/g (or less than about 0.01 cm$^3$/g, such as down to about 0.001 cm$^3$/g); optionally a total surface area of about 100 m$^2$/g to about 300 m$^2$/g (such as at least about 150 m$^2$/g, or at least about 180 m$^2$/g, or about 250 m$^2$/g or less, and in particular about 100 m$^2$/g to about 300 m$^2$/g, about 150 m$^2$/g to about 250 m$^2$/g, or about 180 m$^2$/g to about 300 m$^2$/g); and optionally a ratio of external surface area to total surface area of at least about 0.80 (or at least about 0.85 or at least about 0.90, such as up to about 1.20 or more).

As shown in Table 3, Catalyst E is a catalyst including a Group 8-10 metal (Co), not including phosphorus, having a still smaller mean pore diameter (~39 Å), and having a relatively large surface area (~1500 m$^2$/g). Catalyst E also exhibited a substantial amount of micropore volume (~0.52 cm$^3$/g). This micropore volume corresponded to about 74% of the total pore volume for Catalyst E. It is noted that, although Catalyst E exhibited a higher external surface area than Catalyst F or Catalyst B, most of the surface area of Catalyst E corresponded to surface area within the pores. Also, because the support for Catalyst E corresponded to activated carbon, Catalyst E can potentially be a relatively low cost demetallization catalyst.

More generally, Catalyst E is believed to be representative of supported demetallization catalysts including/having at least about 1.0 wt % of a Group 6 metal (such as about 1.0 wt % to about 5.0 wt %, or at least about 2.0 wt % or at least about 3.0 wt %, and in particular about 1.0 wt % to about 5.0 wt %, about 2.0 wt % to about 5.0 wt %, or about 3.0 wt % to about 5.0 wt %); at least about 0.5 wt % of a Group 8-10 metal (such as about 0.5 wt % to about 1.5 wt %, or at least about 0.7 wt %, or at least about 1.0 wt %, and in particular about 0.5 wt % to about 1.5 wt %, about 0.7 wt % to about 1.5 wt %, or about 1.0 wt % to about 1.5 wt %); optionally substantially no phosphorus content; a total surface area of at least about 800 m$^2$/g (or at least about 1000 m$^2$/g, or at least about 1200 m$^2$/g, such as up to about 2000 m$^2$/g or more); a mean pore diameter of 60 Å or less (or about 50 Å or less, such as down to about 25 Å); optionally a micropore volume of at least about 0.1 cm$^3$/g (or at least about 0.2 cm$^3$/g, or at least about 0.4 cm$^3$/g, such as up to about 1.0 cm$^3$/g); and optionally the support being substantially free of alumina, such as a support composed of carbon, such as activated carbon.

As shown in Table 3, Catalyst B is a catalyst including a Group 8-10 metal (Co), not including phosphorus, and having an intermediate mean pore diameter (~192 Å). Based on the mean pore diameter, Catalyst F can be considered to be a "large pore" demetallization catalyst. Catalyst F also exhibited a reduced/minimized amount of micropore volume, so that almost all of the catalyst surface area corresponded to external surface area, as opposed to surface area within pores of the catalyst.

More generally, Catalyst B is representative of supported demetallization catalysts including/having at least about 1.0 wt % of a Group 6 metal (such as about 1.0 wt % to about 5.0 wt %, or at least about 2.0 wt % or at least about 3.0 wt %, and in particular about 1.0 wt % to about 5.0 wt %, about 2.0 wt % to about 5.0 wt %, or about 3.0 wt % to about 5.0 wt %); at least about 0.5 wt % of a Group 8-10 metal (such as about 0.5 wt % to about 1.5 wt %, or at least about 0.7 wt %, or at least about 1.0 wt %, and in particular about 0.5 wt % to about 1.5 wt %, about 0.7 wt % to about 1.5 wt %, or about 1.0 wt % to about 1.5 wt %); optionally substantially no phosphorus content; optionally a mean pore diameter of about 250 Å or less (or about 200 Å or less, such as down to about 120 Å); optionally a total surface area of about 140 m$^2$/g or less (such as about 80 m$^2$/g to about 140 m$^2$/g); optionally a micropore volume of less than about 0.05 cm$^3$/g (or less than about 0.01 cm$^3$/g, such as down to about 0.001 cm$^3$/g); and optionally a ratio of external surface area to total surface area of at least about 0.80 (or at least about 0.85 or at least about 0.90, such as up to about 1.20).

Example 4—Comparison of Catalyst E and Reference Catalyst

Figure 11:
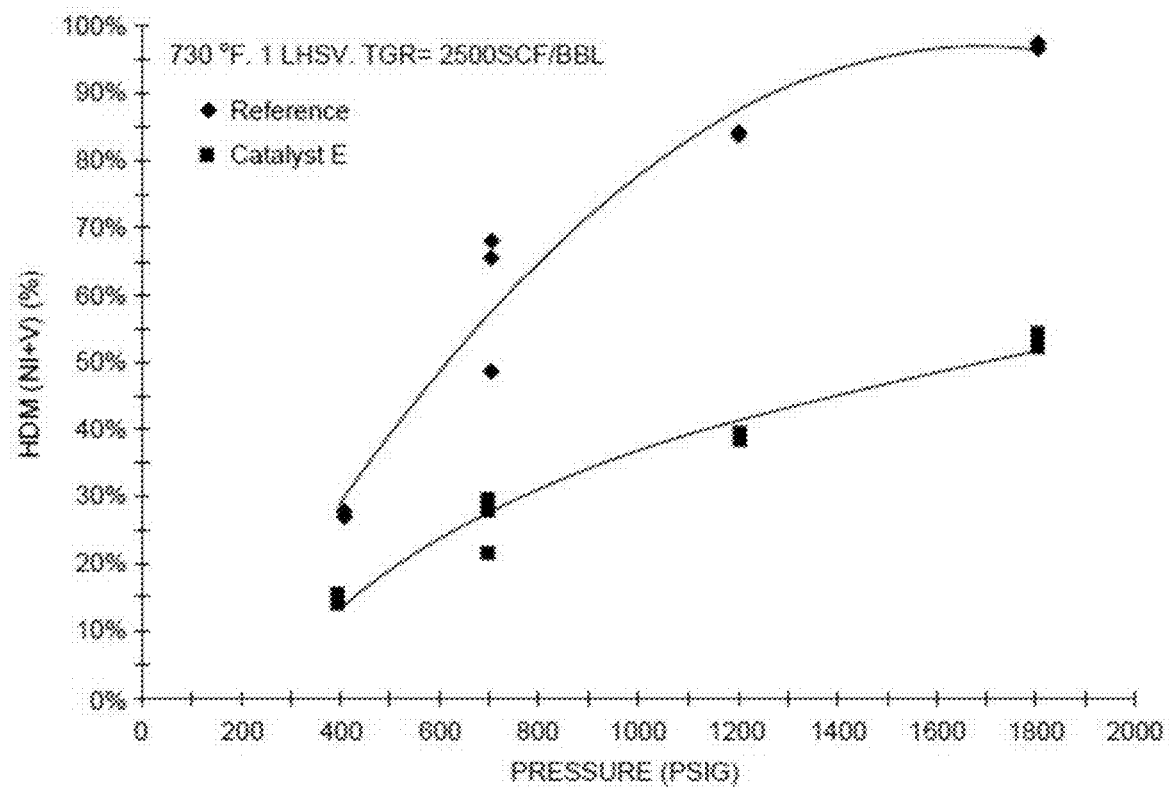
FIG. 11 shows hydrodemetallization activity of various catalysts at varying pressures.
Figure 12:
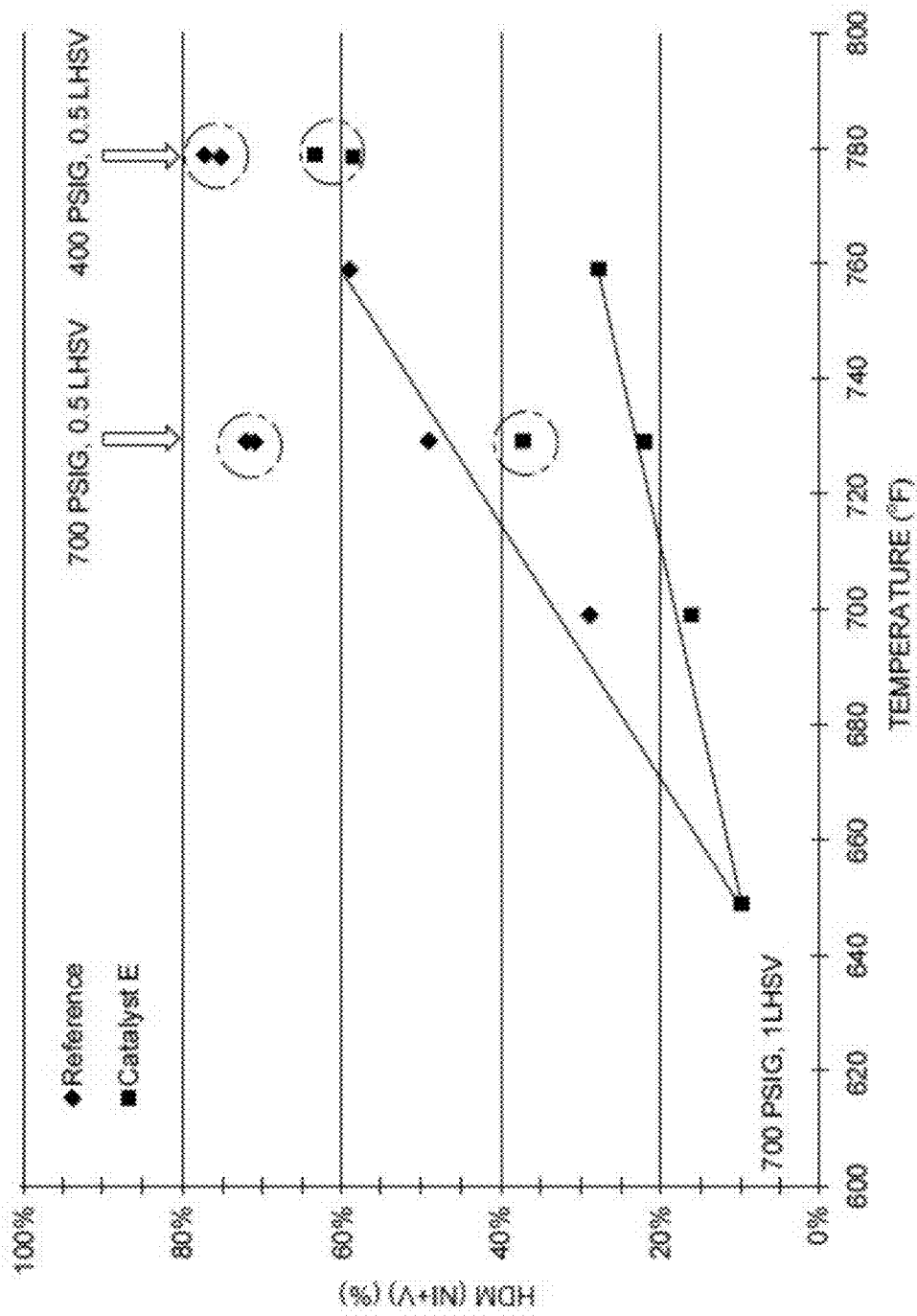
FIG. 12 shows hydrodemetallization activity of various catalysts at varying temperatures.

FIGS. 11-12 show results from performing demetallization (under hydrodemetallation conditions) on a heavy oil feed using Catalyst E and a commercially available reference demetallization catalyst having an alumina support. The feed for FIGS. 11 and 12 corresponded to a mixture of an atmospheric resid type feed (~20 wt %) and a feed for FCC processing prior to any pre-hydrotreatment (~80 wt %). The feed contained about 8.5 wppm of Ni, about 19.8 wppm of V, about 3.14 wt % of micro carbon residue, about 2.05 wt % S, and about 1960 wppm N. About 14.3 wt % of the feed had a boiling point of at least ~1050° F. (~566° C.).

FIG. 11 shows the amount of demetallization as a function of pressure. For the data shown in FIG. 11, the feed was exposed to the reference catalyst or Catalyst E under slurry hydroprocessing demetallization conditions at a temperature of about 730° F., a LHSV of about 1 hr$^{-1}$, and a hydrogen treat gas rate of about 2500 SCF/bbl (~450 Sm$^3$/m$^3$). The pressure was varied to generate the results shown. As shown in FIG. 11, the reference catalyst generally provided a higher amount of demetallization. However, at lower pressures of about 800 psig (~5.6 MPag) or less, the difference in demetallization was less than about a factor of two. Based on the lower cost of a catalyst with an activated carbon support, a demetallization catalyst with an activated carbon support can be cost effective for demetallization at low pressure conditions.

FIG. 12 shows additional results from demetallization (under hydrodemetallation conditions) of the feed using the reference catalyst and Catalyst E. For the results in FIG. 12, the feed was exposed to the reference catalyst or Catalyst E under fixed bed conditions at a temperature of about 750°

F.-790° F. (~399° C.-~421° C.), a LHSV of about 0.5 hr$^{-1}$ to about 1 hr$^{-1}$, a pressure of about 400 psig (~2.8 MPag) to about 700 psig (~4.9 MPag), and a hydrogen treat gas rate of about 2500 SCF/bbl (~450 Sm$^3$/m$^3$). As shown in FIG. 12, as the space velocity and pressure were reduced, such as the condition at ~400 psig (~2.8 MPag) and 0.5 hr$^{-1}$ shown in the upper right corner of the figure, Catalyst E can provide comparable levels of demetallization to the commercially available reference catalyst.

Example 5—Additional Catalyst Comparison

Figure 13:
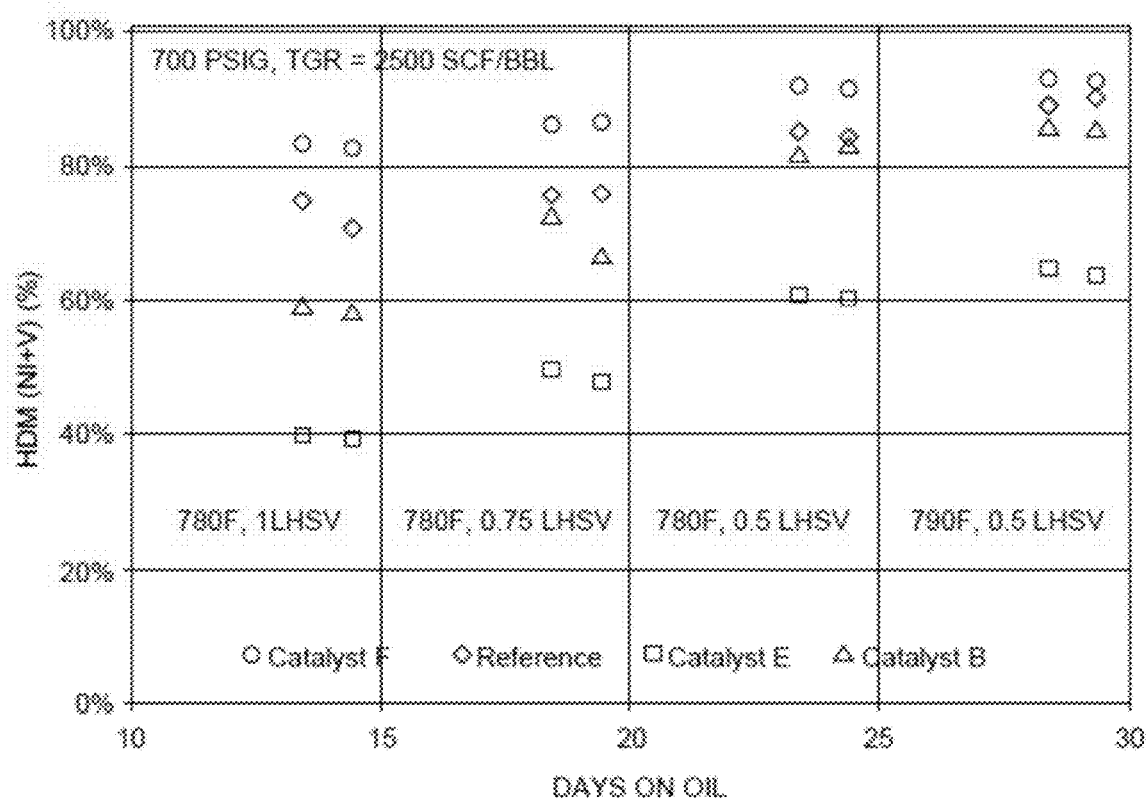
FIG. 13 shows demetallization activity of various catalysts under slurry hydroprocessing demetallization conditions.
Figure 14:
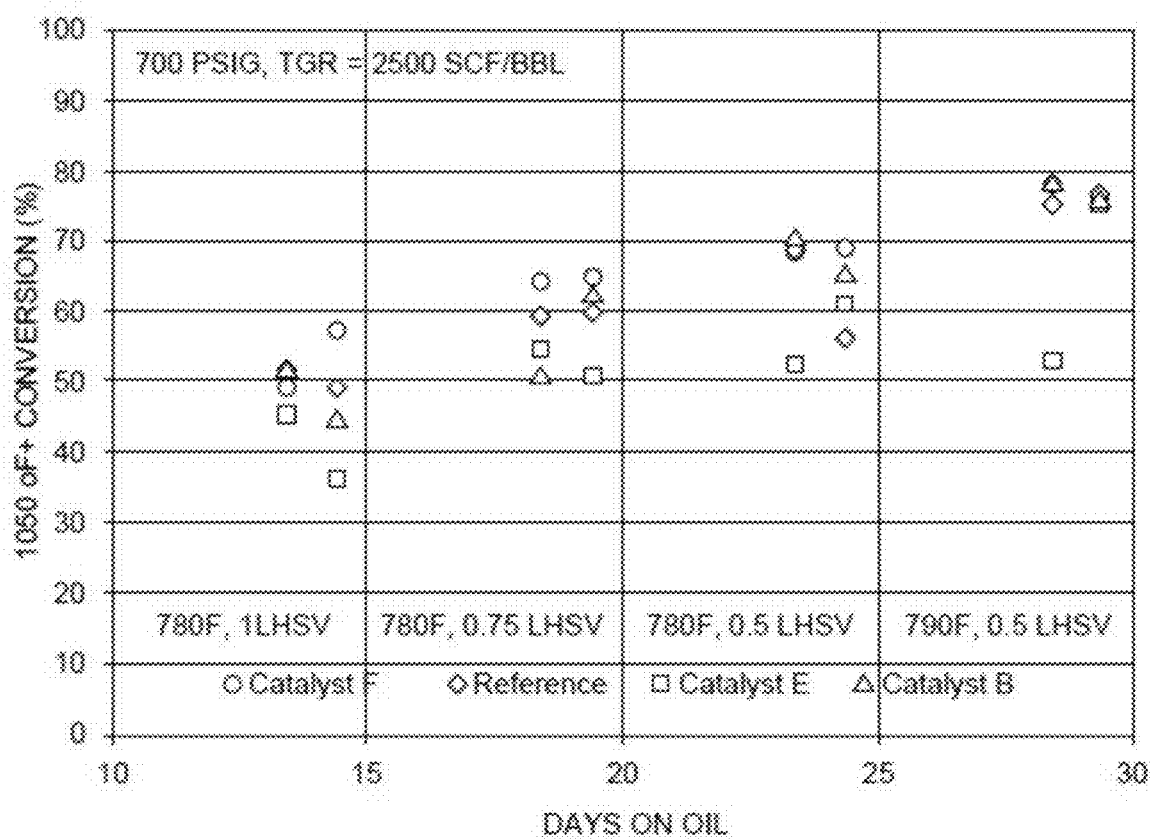
FIG. 14 shows activity for ~1050° F.+(~566° C.+) conversion of various catalysts under slurry hydroprocessing demetallization conditions.

FIGS. 13 and 14 show demetallization amounts and ~1050° F.+(~566° C.) conversion amounts for the commercially available reference catalyst and Catalysts B, E, and F at a series of conditions for a feed corresponding to a mixture of an atmospheric resid (~20 wt %) and a feed for FCC processing before any pre-hydrotreatment (~80 wt %). The feed for FIGS. 13 and 14 contained about 7.9 wppm of Ni, about 18.7 wppm of V, about 2.76 wt % of micro carbon residue, about 2.02 wt % S, and about 1810 wppm N. About 14.3 wt % of the feed had a boiling point of at least ~1050° F. (566° C.). The feed was exposed to the catalysts under slurry hydroprocessing demetallization conditions at about 700 psig (~4.9 MPag) and a hydrogen treat gas rate of about 2500 SCF/bbl (~450 Sm$^3$/m$^3$). The temperature was either about 780° F. (~416° C.) or about 790° F. (~421° C.) and the LHSV was ~0.5 hr$^{-1}$, ~0.75 hr$^{-1}$, or ~1.0 hr$^{-1}$.

Under the reaction conditions, Catalyst E appeared somewhat less active than the other catalysts. It was also noted that Catalyst E experienced some coke formation on the catalyst under the reaction conditions. In FIG. 13, Catalyst F showed the highest amounts of demetallization, with greater than about 80% demetallization at all conditions shown in FIG. 13. Additionally, catalyst F provided about 70% hydrodesulfurization and greater than 90% demetallization for the reaction conditions at the lowest space velocity. The hydrodenitrogenation under all conditions for Catalyst F was less than ~10%. With regard to FIG. 14, Catalyst B, Catalyst F, and the reference catalyst were comparable in the amount of ~1050° F.+(~566° C.+) conversion, with Catalyst F providing somewhat higher amounts of conversion. This was somewhat unexpected, as Catalyst F corresponded to a catalyst with a relatively small pore diameter (~107 Å) for a demetallization catalyst.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A process for producing a hydroprocessed product, comprising:
   exposing a feedstock to a catalyst under effective slurry hydroconversion conditions to form a slurry hydroprocessing effluent, the effective slurry hydroconversion conditions being effective for conversion of at least about 90 wt % of the feedstock relative to a conversion temperature, the catalyst comprising catalyst particles having a particle size of at least about 2 μm;
   separating at least about 95 wt % of the catalyst particles having a particle size of at least about 2 μm from the slurry hydroprocessing effluent using a catalyst recovery system comprising one or more drum separators and a cross-flow filter; and further comprising exposing the feedstock to a demetallization catalyst under slurry hydroprocessing demetallization conditions prior to exposing the combined feedstock to the catalyst under slurry hydroconversion conditions;
   wherein the demetallization catalyst comprises at least about 1.0 wt % of a Group 6 metal, at least about 0.5 wt % of a Group 8-10 metal, and at least about 1.0 wt % of phosphorus on a support, the catalyst having a mean pore diameter of about 200 Å or less, the catalyst having at least one of a micro pore volume of less than about 0.05 cm$^3$/g and a ratio of external surface area to total surface area of at least about 0.80.

2. The process of claim 1, wherein the feedstock has a T95 distillation point of about 600° C. or less.

3. The process of claim 1, wherein the feedstock has a 10% distillation point of at least about 900° F. (~482° C.), a Conradson carbon residue of at least about 27.5 wt %, or a combination thereof.

4. The process of claim 1, wherein the one or more drum separators comprise cyclone separators.

5. The process of claim 1, wherein a) the demetallization catalyst has a mean pore diameter of 60 Å or less, b) the demetallization catalyst comprises a catalyst with a surface area of at least about 1000 m$^2$/g, the catalyst optionally having a support that is substantially free of alumina, or c) a combination of a) and b).

6. The process of claim 1, wherein the demetallization catalyst comprises a total surface area of 140 m$^2$/g or less.

* * * * *